United States Patent
Tange et al.

(10) Patent No.: US 6,285,944 B1
(45) Date of Patent: Sep. 4, 2001

(54) APPARATUS AND METHOD FOR PERFORMING AUTOMATIC CONTROL OVER VELOCITY OF AUTOMOTIVE VEHICLE

(75) Inventors: Satoshi Tange, Yokohama; Kenichi Egawa, Tokyo, both of (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 09/335,478

(22) Filed: Jun. 18, 1999

(30) Foreign Application Priority Data

Jun. 18, 1998 (JP) .................................. 10-171552
Jun. 30, 1998 (JP) .................................. 10-184457

(51) Int. Cl.[7] .............................. B60T 7/00; B60T 8/00; G05D 3/00; G05D 13/00; G06F 7/00; G06F 17/00; G06F 19/00

(52) U.S. Cl. ................................ 701/96; 701/82; 701/83; 701/91; 701/93; 701/96; 364/426.01-426.05; 303/121; 303/122; 303/146; 303/147; 303/165; 303/192; 303/193; 303/198; 180/167; 180/168; 180/169; 180/197; 280/707; 280/708; 280/840

(58) Field of Search .................... 701/96, 93, 91, 701/83, 82; 364/426.02, 426.03, 426.05, 426.01, 426.04; 303/192, 193, 198, 146, 147, 121, 122, 165; 180/167, 168, 169, 197; 280/707, 708, 840

(56) References Cited

U.S. PATENT DOCUMENTS

| | | | |
|---|---|---|---|
| 4,926,333 | * | 5/1990 | Hashiguchi et al. ............ 364/426.02 |
| 4,985,836 | * | 1/1991 | Hashiguchi et al. ............ 364/426.02 |
| 5,099,942 | | 3/1992 | Kushi et al. ............................ 180/197 |
| 5,151,861 | * | 9/1992 | Danno et al. .................... 364/426.02 |
| 5,278,764 | | 1/1994 | Iizuka et al. ............................ 364/461 |
| 5,418,727 | | 5/1995 | Ikeda et al. ...................... 364/426.04 |
| 5,454,442 | | 10/1995 | Labuhn et al. ........................ 180/169 |
| 5,566,776 | | 10/1996 | Iwata ..................................... 180/197 |
| 5,594,645 | | 1/1997 | Nishimura et al. ........... 364/426.044 |
| 5,615,932 | * | 4/1997 | Okazaki ................................ 303/121 |
| 5,893,896 | | 4/1999 | Imamura et al. ...................... 701/70 |
| 5,969,640 | | 10/1999 | Timm et al. .......................... 340/903 |
| 6,056,374 | * | 5/2000 | Hiwatashi ............................. 303/193 |

FOREIGN PATENT DOCUMENTS

| | | |
|---|---|---|
| 44 14 657 | 11/1995 | (DE) . |
| 0387 874 | 9/1990 | (EP) . |
| 0813 987 | 12/1997 | (EP) . |
| 3-153426 | 7/1991 | (JP) . |

* cited by examiner

*Primary Examiner*—William A. Cuchlinski, Jr.
*Assistant Examiner*—Ronnie Mancho
(74) *Attorney, Agent, or Firm*—Foley & Lardner

(57) ABSTRACT

When it is detected that a vehicle is running on a road surface which has a coefficient of friction sufficiently low as to invite ready road wheel slippage, a control which enables the vehicle to automatically follow a preceding vehicle at a predetermined inter-vehicle distance, is inhibited. In one embodiment, when a request for vehicle follow-up is issued by the driver, and the follow-up is inhibited, the driver is informed of the low frictional coefficient of the road and is required to issue a confirmation that follow-up is required before its implementation can be carried out.

22 Claims, 22 Drawing Sheets

APPARATUS AND METHOD FOR PERFORMING AUTOMATIC CONTROL OVER VELOCITY OF AUTOMOTIVE VEHICLE

BACKGROUND OF THE INVENTION a) Field of the Invention

The present invention relates to apparatus and method for performing an automatic control over a velocity of an automotive vehicle in which the apparatus is mounted so as to maintain an inter-vehicle distance from the vehicle to another vehicle running ahead of the vehicle to follow up the other vehicle.

b) Description of the Related Art

A Japanese Patent Application First Publication (non-examined) No. Heisei 3-153426 published on Jul. 1, 1991 exemplifies a previously proposed automatic vehicular velocity control system.

In the previously proposed automatic vehicular velocity control system disclosed in the above-identified Japanese Patent Application First Publication, a vehicular engine output control method is disclosed in which a, so-called, auto-cruise control function such that a vehicular velocity is controlled to maintain a preset vehicular velocity is provided and a traction control function such that an engine output is reduced, with an engine throttle valve closed, in accordance with a slip rate of vehicular road wheels if slips of the vehicular road wheels occurs is provided.

In this method, a traction control signal is outputted to an auto-cruise control system from a traction control system. In the auto-cruise control system, its controller determines whether the traction control signal is inputted during an ordinary auto-cruise control operation.

When no traction control signal is inputted, the auto-cruise control is continued.

When the traction control signal is inputted, the auto-cruise control is inhibited and a higher priority on controls is given to the traction control.

SUMMARY OF THE INVENTION

However, in the previously proposed engine output control method described in the BACKGROUND OF THE INVENTION, the controller of the auto-cruise control system decides whether the traction control signal is inputted during the auto-cruise control operation.

Although an inhibit or a continuation of the auto-cruise control according to the presence or absence in the traction control signal can be decided, the inhibit of a start of the auto-cruise control when the vehicle is running on a road surface having a low frictional coefficient such as a snowy road, a frozen road surface, and a wet road surface cannot be made. Then, the auto-cruise control or its evolving type of a preceding vehicle follow-up run control (a vehicular velocity control such as to follow up a preceding vehicle running ahead of the vehicle) is started even on the vehicular run on the low frictional road surface so that a steering stability is reduced.

It is, therefore, an object of the present invention to provide automatic vehicular velocity controlling apparatus and method for an automotive vehicle which can assure a stable run in accordance with a variation in a road surface condition (situation) by inhibiting the preceding vehicle follow-up run control during the vehicular run on the low frictional coefficient road surface or entrusting to a vehicular driver's decision of whether the preceding vehicle follow-up run control should be carried out or not after a vehicular driver is informed of the vehicular run on the low frictional coefficient road surface.

According to one aspect of the present invention, there is provided with a vehicular velocity controlling apparatus for an automotive vehicle, comprising: a controller, the controller including such a control function as to perform a vehicular velocity control for the vehicle to follow up a preceding vehicle which is running ahead of the vehicle and to maintain an inter-vehicle distance to the preceding vehicle at a target inter-vehicle distance; a road surface situation detector, the road surface situation detector detecting a road surface situation on which the vehicle runs; and a control instruction generator, the control instruction generator being responsive to a result of a detection by the road surface situation detector indicating that the detected road surface has a predetermined frictional coefficient such as to develop easily vehicular slips and generating and outputting a disable instruction to inhibit an operation of the control function of the controller to perform the vehicular velocity control to follow up the preceding vehicle.

According to another aspect of the present invention, there is provided with a vehicular velocity controlling method for an automotive vehicle, comprising: detecting a road surface situation of a road surface on which the vehicle runs; determining whether the detected road surface has a predetermined frictional coefficient such as to develop vehicular slips; and outputting a disable instruction to inhibit an operation of a preceding vehicle follow-up run control such as to perform a vehicular velocity control for the vehicle to follow up a preceding vehicle which is running ahead of the vehicle and to maintain an inter-vehicle distance to the preceding vehicle at a target value of the inter-vehicle distance when determining that the detected road surface has the predetermined frictional coefficient.

This summary of the invention does not necessarily describe all necessary features so that the present invention may also be a sub-combination of these described features.

DETAILED DESCRIPTION OF THE PREFERRED EMBODIMENTS

Reference will hereinafter be made to the drawings in order to facilitate a better understanding of the present invention.

(First Embodiment)

Figure 1A:
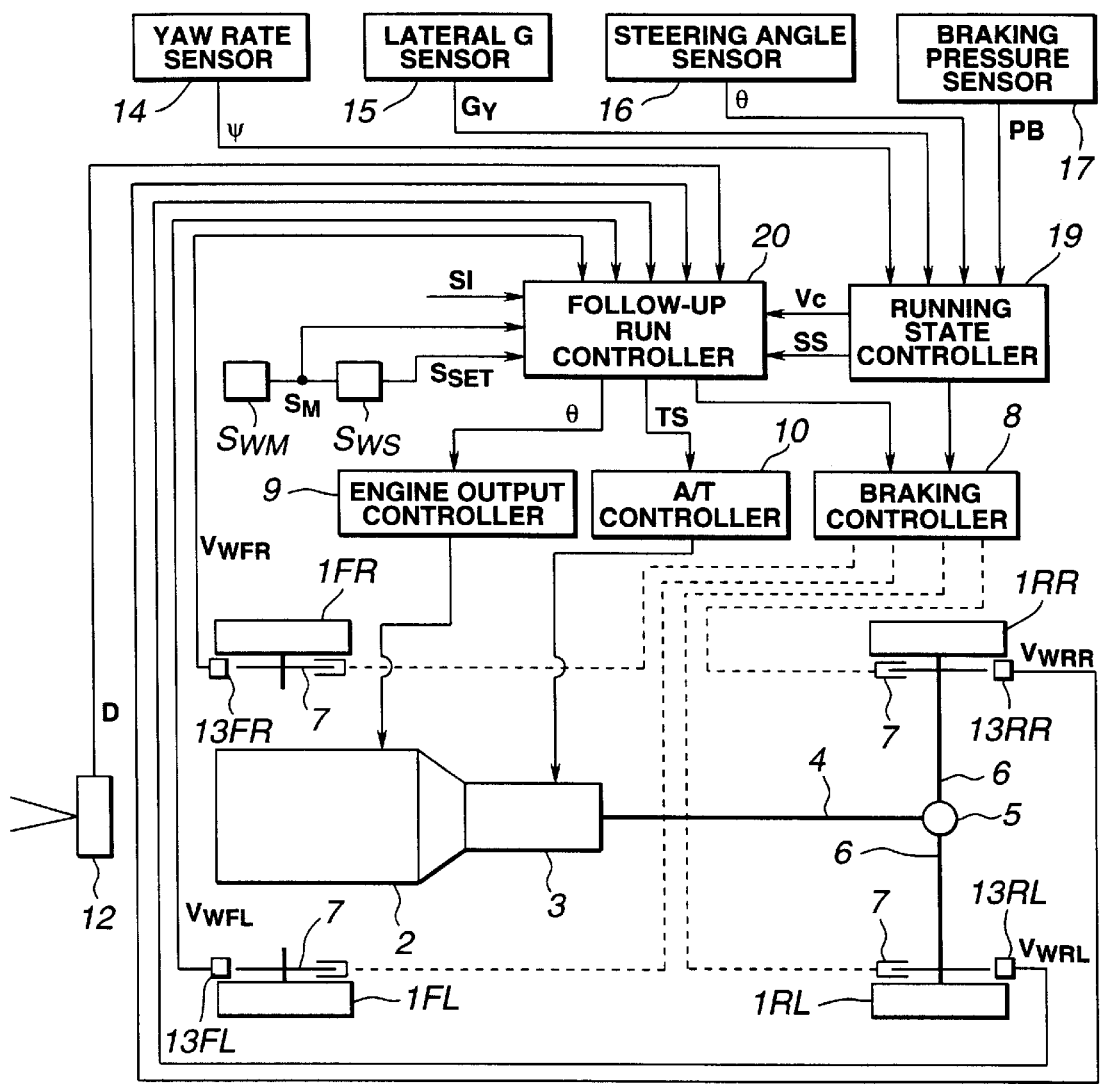
FIG. 1A is a schematic system configuration of an apparatus for performing an automatic control over a vehicular velocity for an automotive vehicle in a first preferred embodiment according to the present invention.

FIG. 1A shows a schematic circuit block diagram of a first preferred embodiment of an automatic vehicular velocity controlling apparatus according to the present invention applicable to a rear wheel drive vehicle.

In FIG. 1A, 1FL and 1FR denote front left and right road wheels as non-driven road wheels and 1RL and 1RR denote rear left and right road wheels as driven road wheels. A driving force of a prime mover, viz., an engine 2 is transmitted to the rear left and right road wheels 1RL and 1RR via an automatic transmission (A/T) 4, a final differential gear 5, and road wheel axles 6 so as to rotatably drive these driven wheels 1RL and 1RR.

In FIG. 1A, disc brakes 7 are respectively disposed on the front left and right road wheels 1FL and 1FR and on the rear left and right road wheels 1RL and 1RR so as to develop braking forces thereon and a braking controller 8 is installed to control a braking liquid pressure applied to these disc brakes 7, the braking forces being developed by means of the braking liquid pressure.

The braking controller 8 develops the braking liquid pressure in accordance with a depression depth of a brake pedal (not shown) and also in accordance with a braking liquid pressure command value outputted from a preceding vehicle follow-up run controller (also called, a vehicular run controller) 20 (in FIG. 1A, a follow-up run controller) as will be described later.

In addition, an engine output controller 9 is installed to control an output of the engine 2. The engine output controller 9 includes a throttle valve actuator for actuating an engine throttle valve to be adjustably opened or closed so as to manage an engine revolution speed or an engine idling valve controller for controlling an opening degree of an idling valve of the engine 2 to manage an revolution speed of the engine during an engine idling condition. In the first embodiment, the former control method of adjusting an opening degree of the throttle valve.

Furthermore, an automatic transmission controller (A/T controller) 10 is installed for the automatic transmission 8 to control a gear position of the automatic transmission. The gear position of the automatic transmission 8 is controlled in accordance with an up-shift command and down-shift command by the A/T controller 10 in response to an up-shift/down-shift command value TS inputted thereto from the vehicular run controller 20, as will be described later.

On the other hand, each road wheel velocity sensor 13FL and 13FR is installed to detect a corresponding front road wheel velocity of the front left and right road wheels 1FL and 1FR. Each road wheel velocity sensor 13RL and 13RR is also installed to detect a corresponding rear road wheel velocity of the rear left and right road wheels 1RL and 1RR.

A yaw rate (yaw angular velocity) sensor 14 is installed on the vehicle to detect a yaw rate φ, a lateral G sensor 15 is installed on the vehicle to detect a lateral acceleration imposed on the vehicle, a steering angle sensor 16 is installed on a steering wheel of the vehicle to detect a steering angular displacement θ, and a braking pressure sensor 17 is installed on a master cylinder to detect a liquid pressure of the master cylinder in a braking system of the vehicle.

An inter-vehicle distance sensor 18 constituted by a radar unit is disposed on a front lower side of a vehicle body of the vehicle to detect an inter-vehicle distance from the vehicle to another vehicle which is running ahead of the vehicle (also called, a preceding vehicle).

Figure 1B:
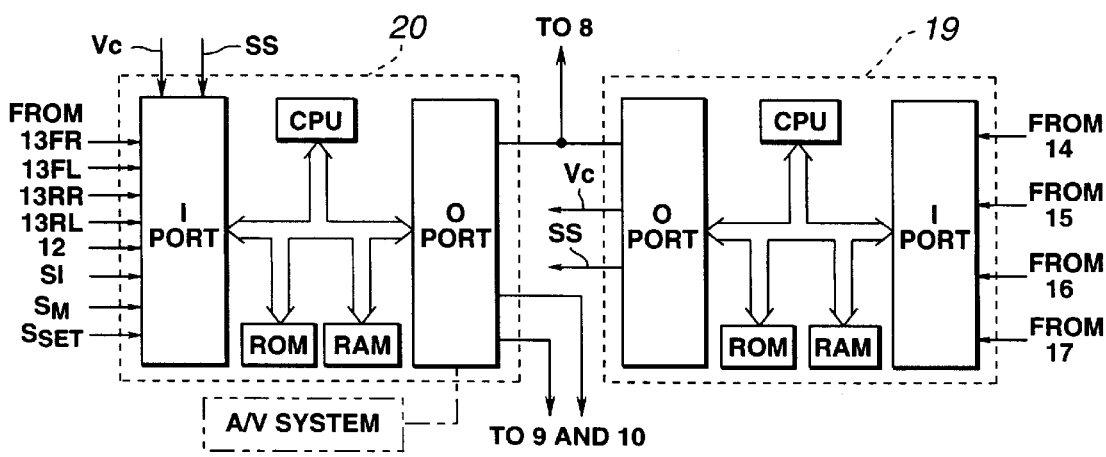
FIG. 1B is a schematic circuit block diagram of a preceding vehicle follow-up run controller (simply referred to as a vehicular run controller) and a road surface condition dependent vehicular run condition controller (simply referred to as a vehicular state controller) shown in FIG. 1A.

FIG. 1B shows a schematic circuit block diagram of the vehicular run controller 20 and a vehicular state controller 19 (in FIG. 1A, a running state controller) connected to the vehicular run controller 20.

Each output signal from the road wheel velocity sensors 13FL, 13FR, 13RL, and 13RR, the yaw rate sensor 14, the lateral G sensor 15, the steering angle sensor 16, and the braking pressure sensor 17 is inputted to the vehicular state controller 19. The vehicular state controller 19 calculates an estimated vehicular body velocity Vc on the basis of road wheel velocities VWFL, VWFR, VWRL, and VWRR detected by means of the road wheel velocity sensors 13FL, 13FR, 13RL, and 13RR, calculates road wheel accelerations/decelerations VWFL', VWFR', VWRL', and VWRR' with the respective road wheel velocities VWFL, VWFR, VWRL, and VWRR differentiated, executes an anti-lock brake control on the basis of these values of the road wheel velocities and accelerations/decelerations. In addition, the vehicular state controller 19 executes a driving force control to prevent slips on the drive, wheels while the anti-lock brake control is not executed, and executes a side-slip control in such a manner that a side-slip angle of the vehicle during the run on a low frictional coefficient road surface such as a snowy road or frozen road is made coincident with a target value of the side-slip angle derived on the basis of a steering manipulated variable and a braking manipulated variable by a vehicular driver so as to stabilize a vehicular steering characteristic while the driving force control described above is not executed. Furthermore, the vehicular state controller 19 outputs an execution status (control status) signal SS having a logical value of "1" representing that either the driving force control or the side-slip control is executed to the vehicular run controller 20, as will be described later.

It is noted that, in the side-slip control, the vehicular state controller 19 calculates the target value of the side-slip angle on the basis of the steering angular displacement θ detected by the steering angle sensor 17 and the master cylinder liquid pressure $P_B$ detected by the braking pressure sensor 17, calculates an actual side-slip angle on the basis of the detected yaw rate φ by the yaw rate sensor 14 and the lateral acceleration Gv detected by means of the lateral G sensor 15, and controls the braking pressure against each disc brake 7 of each corresponding road wheels 1FL through 1RR so that the calculated actual side-slip angle is made coincident with the target value of the side-slip angle, thus the steering characteristic of the vehicle being matched with that the vehicular driver has intended.

The vehicular run controller 20 receives the inter-vehicle distance D detected by means of the inter-vehicle distance sensor 18, the vehicle body velocity Vc outputted from the vehicular state controller 19, the execution status signal SS representing that either the driving force control or the side-slip control is being executed, an ignition switch signal SI on an ignition switch, and switch signals SM and $S_{SET}$ of main switch SWM and set switch $SW_S$ representing the selection of whether the preceding vehicle follow-up run control should be executed or not.

The vehicular run controller 20 governs the braking controller 8, the engine output controller 9, and the automatic transmission controller 10 on the basis of the inter-vehicle distance D detected by the inter-vehicle distance sensor 12 and the vehicular body velocity Vc calculated by the vehicular state controller 19 so that the vehicle is controlled to follow up the preceding vehicle maintaining the inter-vehicle distance to the preceding vehicle at an appropriate inter-vehicle distance.

The vehicular run controller 20 sets a vehicular state controller operation history flag FF to "1" when receiving the execution status signal SS having the logical value of "1" from the vehicular state controller 19.

At this time, the vehicular run controller 20 forcefully finishes the preceding vehicle follow-up control when the preceding vehicle follow-up run control is being executed and inhibits a start of the preceding vehicle follow-up run when no preceding vehicle follow-up run control is executed.

It is noted that the main switch SWM has a self-hold function, supplies a power from the ignition switch to the set switch SWS when it is turned on and becomes a self-hold state, continues its self-hold state even if the position of the main switch is returned from the on position to a neutral state, and releases its self-hold state when it is turned off or the ignition switch is turned off.

The vehicular run controller 20 includes a microcomputer having a CPU (Central Processing Unit), a RAM (Random Access Memory), a ROM (Read Only Memory), an Input Port, an Output Port, and a common bus and the vehicular state controller 19 has the same circuits as the vehicular run controller 20, as shown in FIG. 1B.

Figure 2:
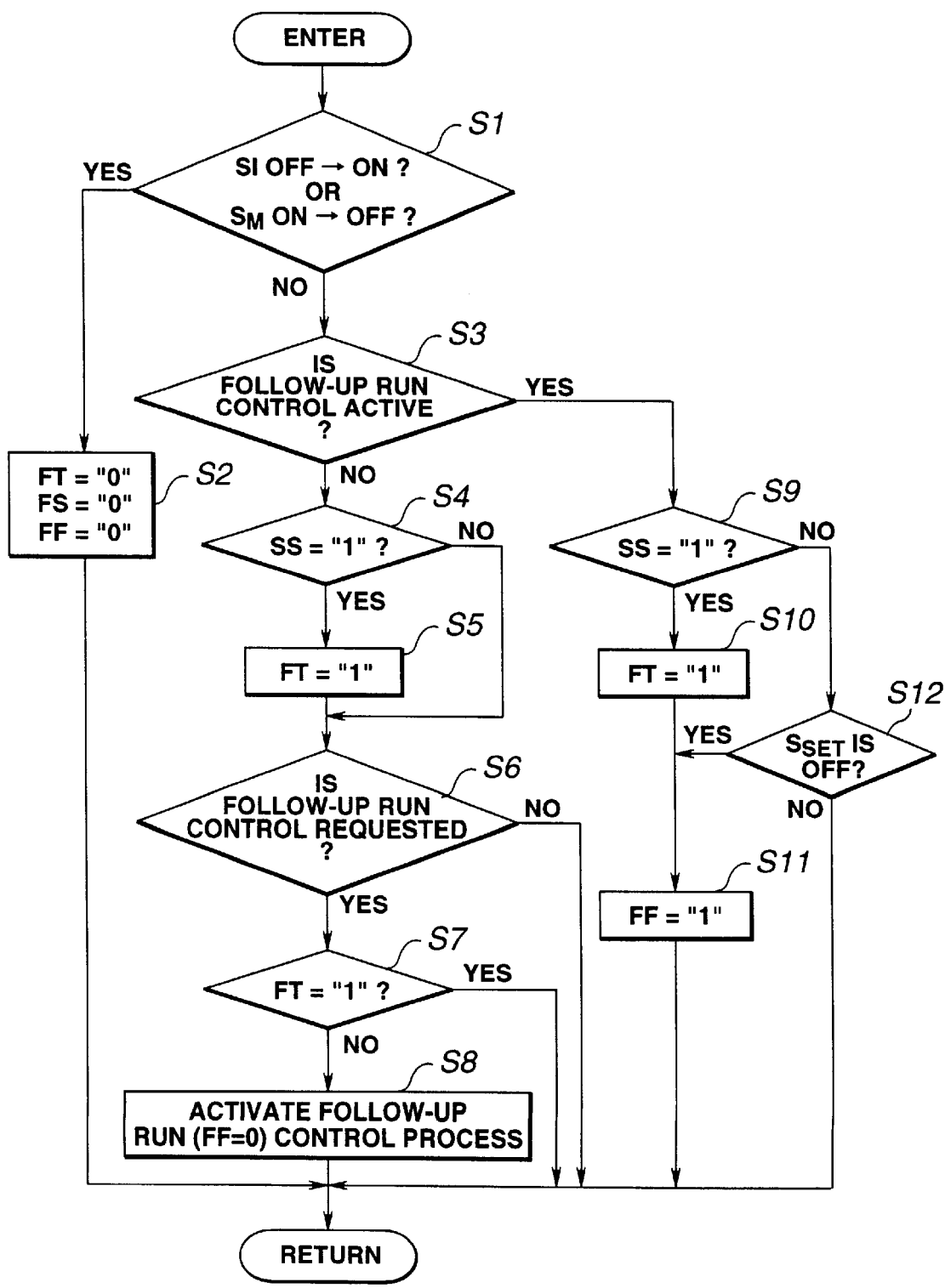
FIG. 2 is an operational flowchart representing an example of a preceding vehicle follow-up run control managing procedure executed in the vehicular run controller shown in FIG. 1A.
Figure 3:
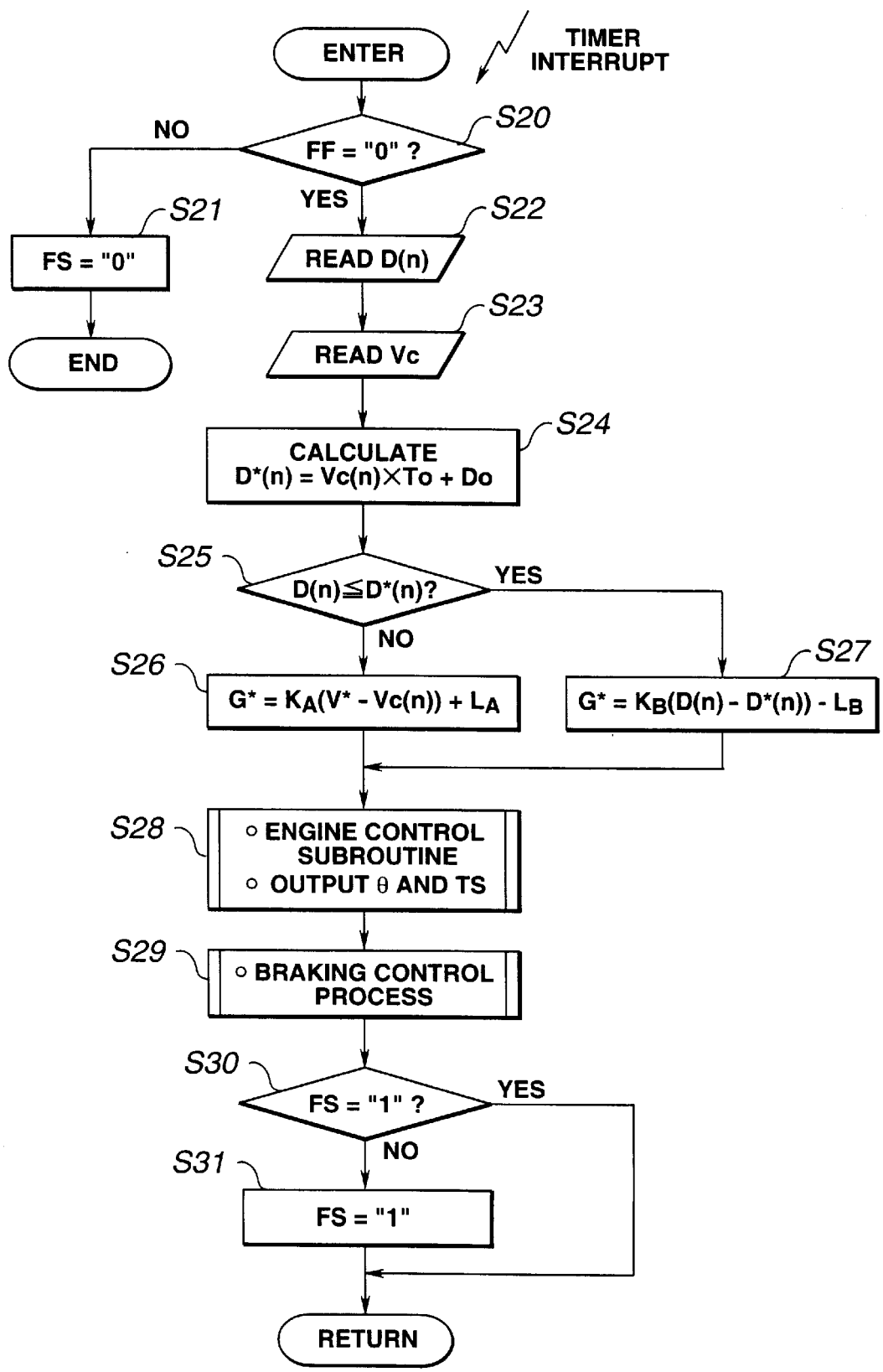
FIG. 3 is an operational flowchart representing an example of a preceding vehicle follow-up run control procedure executed in the vehicular run controller shown in FIG. 1A.

Next, FIG. 2 shows a preceding vehicle follow-up run control managing procedure and FIG. 3 shows a preceding vehicle follow-up run control executed in the vehicular run controller 20 of the first preferred embodiment, each for explaining an operation of the first preferred embodiment shown in FIG. 1A and FIG. 1B.

FIG. 2 shows the preceding vehicle follow-up run control managing procedure executed by the vehicular run controller 20 as a main program.

First, at a step S1, the CPU of the controller 20 determines if the status of the switch signal SI of the ignition switch is changed from an off (non-conduction) state to an on state (conduction) or whether the status of the main switch SWM is changed from the on state to the off state. The term of or means a logical OR.

When a result of determination at the step S1 indicates that either the status of the switch signal SI is changed from the off state to the on state or the status of the switch signal SM is changed from the off state to the on state (Yes), the routine goes to a step S2.

At the step S2, an operation history flag FT representing whether either the driving force control or the side-slip control has been executed in the vehicular state controller 19 is reset to "0" indicating that neither the driving force control nor the side-slip control has been executed in the present driving of the vehicle.

In addition, a preceding vehicle follow-up run inhibit flag FF representing whether the preceding vehicle follow-up run control to be described later should be inhibited or not is reset to "0" indicating that the preceding vehicle follow-up run control is enabled (allowed to execute).

In addition, at the step S2, a preceding vehicle run control state flag FS is reset to "0" representing that the preceding vehicle follow-up run control is not currently being executed. Then, the main routine issues a return instruction to return from the step S2 to the step S1.

In addition, if the result of determination at the step S1 indicates that neither the status of switch signal SI is changed from the on state to the off state nor the status of the switch signal SM of the main switch SWM is changed from the on state to the off state (No), the main routine goes to a step S3.

At the step S3, the CPU of the vehicular run controller 20 determines if the preceding vehicle follow-up run control is being executed. This determination is based on whether the preceding vehicle follow-up run state flag FS is set to "1".

If FS=0 at the step S3 (No), the routine goes to a step S4.

At the step S4, the CPU of the controller 20 determines whether the execution status signal SS has the logical value of "1".

If SS="1" (Yes) at the step S4, the CPU of the controller 20 determines that the vehicle is running on the low frictional coefficient road surface such as the snowy road, the frozen road, or the rainy road and the routine goes to a step S5.

At the step S5, the CPU of the vehicular run controller 20 sets the operation history flag FT to "1" representing that either the driving force control or the side-slip control has been executed and the main routine goes to a step S6.

On the other hand, if the result of the determination at the step S4 indicates that the control state signal SS has a logical value of "0", the CPU of the vehicular run controller 20 determines that the vehicle is running on a high frictional coefficient road surface such as a dry paved road not on the low frictional coefficient road surface and the main routine jumps to the step S6.

At the step S6, the CPU of the vehicular run controller 20 determines if a start condition on the preceding vehicle follow-up run control is satisfied.

The preceding vehicle follow-up run control condition is such that the switch signal $S_{SET}$ of the set switch SWS is read to determine if the switch signal $S_{SET}$ is in the on state, viz., both of the main switch SWM and set switch SWS are turned on and, thus, there is a request issued by the vehicular driver to start the preceding vehicle follow-up run control and the CPU of the controller 20 determines if the estimated vehicular body velocity Vc is equal to or greater than a set lower limit value of the vehicular velocity Vs.

If the switch signal $S_{SET}$ is turned off (No) at the step S6, the CPU of the controller 20 determines that there is no request of starting the preceding vehicle follow-up run control and the routine is returned to the step S1.

If the switch signal $S_{SET}$ is turned on and Vc≧Vs at the step S6, the CPU of the controller 20 determines that the driver issues the request of starting the preceding vehicle follow-up run control and the estimated vehicular body velocity Vc is equal to or greater than the set lower limit vehicular velocity Vs so that the condition to start the preceding vehicle follow-up control condition is satisfied and the routine goes to a step S7.

At the step S7, the CPU of the controller 20 determines if the operation history flag FT is set to "1".

If FT="0" (No at the step S7), the CPU of the controller 20 determines that the vehicle is running on the high frictional coefficient road surface and it is possible to achieve a stable preceding vehicle follow-up run control and the routine goes to a step S8.

At the step S8, the CPU of the controller 20 resets the preceding vehicle follow-up run control inhibit flag FF to "0" to enable the start of the preceding vehicle follow-up run control procedure. Then, the routine is returned to the step S1.

On the other hand, if the result of determination at the step S3 indicates that the preceding vehicle follow-up run inhibit flag FS is reset to "0" (Yes), the CPU of the controller 20 determines that the preceding vehicle follow-up run control is being executed and the routine branches to a step S9.

At the step S9, the CPU of the controller 20 determines whether the status of the read control status signal SS indicates the logical value of "1" or "0". If the logical value indicates "1" at the step S9 (Yes), the routine goes to a step S10.

At the step S10, the CPU of the controller 20 sets the operation history flag FT to "1" and the routine goes to a step S11. At the step S11, the CPU of the controller 20 sets the preceding vehicle follow-up run inhibit flag register FF to "1" so as to inhibit the preceding vehicle follow-up run control and the routine is returned to the step S1.

If the result of determination at the step S9 indicates the control status signal SS has the logical value of "0" (No), the routine goes to a step S12 in which the CPU of the controller 20 determines if the switch signal $S_{SET}$ of the set switch SWS is in the off state.

If $S_{SET}$=OFF (Yes) at the step S12, the CPU of the controller 20 determines that there is a request by the vehicular driver to halt the preceding vehicle follow-up run control and the routine goes to the step S11.

If the switch signal $S_{SET}$ of the set switch SWS is in the on state (No), the CPU of the controller 20 determines that the preceding vehicle follow-up run control is being continued and the routine is returned to the step S1.

Furthermore, the preceding vehicular follow-up run control procedure shown in FIG. 3 is executed as a timer interrupt routine for every predetermined time (for example, 10 milliseconds) with respect to the preceding vehicle follow-up run control managing procedure shown in FIG. 2.

First, at a step S20 of FIG. 3, the CPU of the controller 20 determines if the preceding vehicle follow-up run control inhibit flag FF indicates "1" or "0". If (FF)="1" (No) at the step S20, the routine goes to a step S21.

At the step S21, the CPU of the controller 20 resets the flag FS representing the control state of the preceding vehicle follow-up run control to "0" representing that the preceding vehicle follow-up run control is not being executed. Then, the present interrupt routine is ended. If the flag FF indicates "0" representing that the preceding vehicle follow-up run control is enabled to run (Yes), the interrupt routine goes to a step S22.

At the step S22, the CPU of the controller 20 reads the data on the inter-vehicle distance D(n) from the vehicle to the preceding vehicle detected by the inter-vehicle distance sensor 12.

Then, the CPU of the controller 20 is transferred from the step S22 to the step S23 in which the estimated vehicular body velocity Vc(n) is inputted and read from the vehicular state controller 19. Then, the routine goes to a step S24. It is noted that n=1, 2, - - - ,n.

At the step S24, the CPU of the vehicular run controller 20 calculates a target value D* of the inter-vehicle distance between the vehicle and the preceding vehicle in accordance with the following equation (1) from the estimated vehicular body velocity Vc(n) and a time duration To (inter-vehicle time duration) during which the vehicle has reached to a position on the road Lo (m) presently behind the preceding vehicle.

$$D^*(n)=Vc(n)\times To+Do \quad (1).$$

By adopting a concept of the inter-vehicle time duration, the target inter-vehicle distance D* is set such that as the vehicular velocity becomes increased, the inter-vehicle distance becomes long. It is noted that in the equation (1), Do denotes an inter-vehicle distance at a time point when the vehicle is supposed to be stopped.

Then, the routine of FIG. 3 advances to a step S25 in which the CPU of the controller 20 determines if the actual inter-vehicle distance D(n) is equal to or shorter than the target value D*(n) of the inter-vehicle distance D(n)≧D*(n).

If D(n)>D*(n) (No) at the step S25, the CPU of the controller 20 determines that the actual inter-vehicle distance is too long and it is possible for the vehicle to be accelerated to shorten the inter-vehicle distance D(n) and the routine goes to a step S26.

At the step S26, the CPU of the controller 20 calculates the target value G* of the vehicular acceleration/deceleration in accordance with the following equation (2) on the basis of a present target value of the vehicular velocity V* and stores the target value G* thereof into an acceleration/deceleration storage area to update the presently stored target value G*. Then, the routine goes to a step S28.

$$G^*=K_A\times(V^*-V(n))+L_A \quad (2).$$

In the equation (2), $K_A$ and $L_A$ denote a predetermined control gain and constant.

Then, the routine goes to a step S8.

On the other hand, if Yes at the step S25 (D(n)≦D*(n)), the CPU of the controller 20 determines that the presently detected inter-vehicle distance D(n) is equal to or shorter than the target inter-vehicle distance D*(n) and determines that it is necessary to widen the inter-vehicle distance to decelerate the vehicle. Then, the routine goes to a step S27.

At the step S27, the CPU of the vehicular running controller 20 calculates the target acceleration/deceleration G* into the corresponding memory area in which G* is previously stored so as to update the target value of G*.

Then, the routine goes to the step S28.

$$G^*=K_B\times(D(n)-D^*(n))-L_B \quad (3).$$

In the equation (3), $K_B$ and $L_B$ denote a predetermined control gain (constant) and constant.

At the step S28, this subroutine calculates a command value of θ for the engine output controller 9 to open the throttle valve through the command value of θ and a command value TS for the A/T controller 10 to issue an up-shift command value TS or down-shift command value TS, and executes an engine controlling processing (at the step S28). Then, the routine advances to a step S29.

It is noted that as far as the command value θ of the throttle valve opening angle (degree) is concerned, a variation rate Δθ of the opening angle of the throttle valve is calculated which is increased in a positive direction in accordance with the increase in the target value G* of the acceleration/deceleration when the vehicle is in the acceleration state and the target value G* indicates positive. When the target value G* of the vehicular acceleration/deceleration indicates negative, the variation rate Δθ of the opening angle of the throttle valve which is increased in the negative direction in accordance with the increase in the target value G* of the acceleration/deceleration during the time duration for which the target value G* reaches from "0" to a predetermined value of −Gs. Then, the calculated variation rate Δθ is added to the present command value θ of the opening angle of the throttle valve to derive a new command value θ of the opening angle of the throttle valve (Δθ+θ→θ). When G*<−Gs, the command value of θ is set to "0" or appropriate value in proximity to zero.

It is also noted that the command value TS of the up-shift/down-shift command for the gear shift control of the automatic transmission (A/T) 3 is calculated in accordance with the calculated command value θ of the throttle valve and the vehicular velocity V(n) referring to a map normally used in a gear shift control in the automatic transmission.

At the step S29, the CPU of the controller 20 calculates the target value of the braking pressure $P_B^*$ on the basis of the target value G* of the vehicular acceleration/deceleration stored in the acceleration/deceleration storage area and the routine is returned to a predetermined main program after the braking pressure control process in which the target braking pressure $P_B^*$ is outputted to the braking controller 8 is carried out and the timer interrupt routine shown in FIG. 3 is ended.

Figure 4:
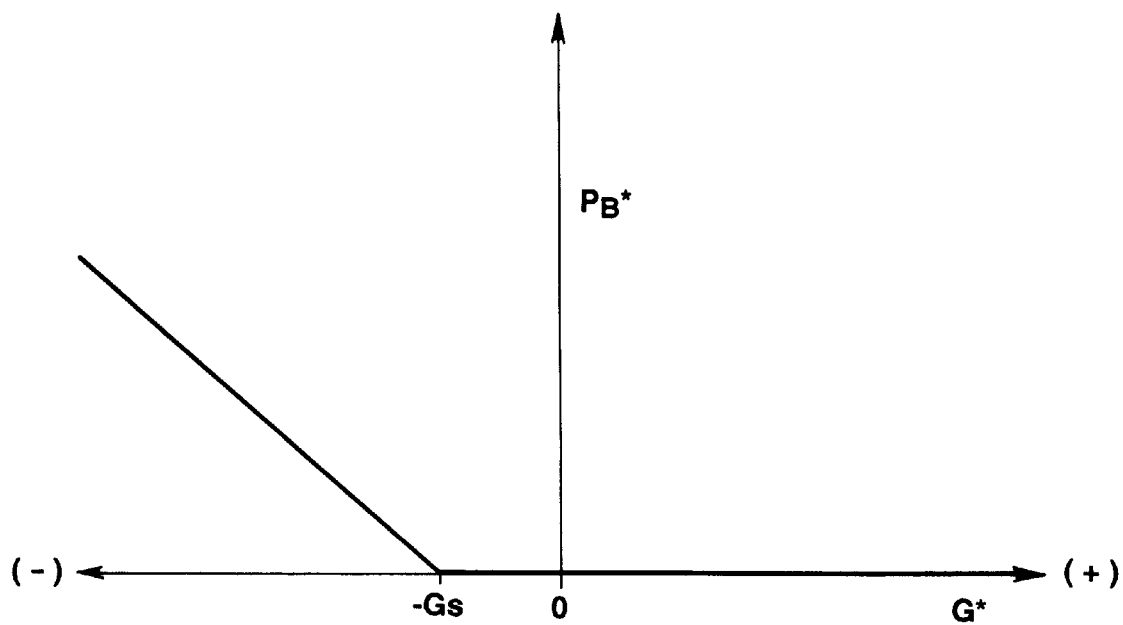
FIG. 4 is a characteristic graph representing an example of a map representing a relationship between a target value $G^*$ of a acceleration/deceleration and a target value $P_B^*$ of a braking pressure in a form of a table map (a two-dimensional array) used in the first embodiment.

It is noted that the target value $P_B^*$ of the braking pressure is calculated using a table look-up technique through a braking pressure map (two-dimensional array) shown in FIG. 4 previously stored in the memory such as the ROM of the vehicular run controller 19 on the basis of the target value G* of the vehicular acceleration/deceleration.

The table map has a lateral axis of the target value G* of the vehicular acceleration/deceleration and a longitudinal axis of the target value $P_B^*$ of the braking pressure, as shown in FIG. 4. If the target value G* of the vehicular acceleration/deceleration is positive and the target value G* is negative in a range from zero to a minus predetermined value of −Gs, the target value $P_B^*$ of the braking pressure is maintained at zero value. If the target value $P_B^*$ of the braking pressure is linearly increased in proportion to the increase of the target value G* of the vehicular acceleration/deceleration in the negative direction.

The steps S4, S5, S9, and S10 correspond to control status storing means, the steps S7, S9 through S11, and S20 correspond to control inhibit means. The steps S7 and S20 correspond to control start inhibit means, and the steps S21 through S28 correspond to follow-up run control means.

Hence, suppose now that the vehicle has stopped with the ignition switch turned off and both of the main switch SWM and the set switch SWS turned off.

In this state, the power is not supplied to each controller 19 and 20, the anti-lock brake control, the driving force control, and side-slip control by means of the vehicular state controller 19 are not executed and the preceding vehicle follow-up control by means of the vehicular run controller 20 is not executed.

When the vehicle has stopped, the engine 2 is started with the ignition switch turned on, each controller 19 and 20 receives its power so that a predetermined control processing is started to be executed.

At this time, since the vehicle is stopped, the vehicular running controller 19 does not execute the anti-lock brake control, the driving force control, and side-slip control. On the other hand, the vehicular run controller 20 executes the preceding vehicle follow-up run control managing procedure. Since the ignition switch is changed from the off state to the on state, the routine of FIG. 2 goes from the step S1 to the step S2 in which the operation history flag register FT is reset to "1", the flag operation history flag FT representing that either the driving force control or the side-slip control has been executed and the preceding vehicle follow-up control inhibit flag FF is reset to "0" in order to initialize these flags. Then, the routine is returned to the step S1. At this time, since the ignition switch is turned on, the routine goes to the step S3 in which the CPU of the controller 20 determines if the preceding vehicle follow-up run control status flag register FS indicates the reset status of "0". Since the flag register FS is already reset to "0" at the step S2, the routine goes to the step S4 from the step S3.

Since the vehicle has been stopped and neither the driving force control nor the side-slip control is carried out, the control status signal SS continues to indicate the logical value of "0" from the vehicular state controller 19. Hence, since the routine jumps to the step S6 without passing the step S5, the operation history flag register FT is continued to be reset to "0".

Thereafter, when the vehicle is started to run on a road surface having a high frictional coefficient road surface such as a dry paved road, the driver thereafter turns on the main switch SWM and turns on the set switch SWS. At this time, at the step S6 of FIG. 2, the switch signal SSET of the set switch SWS is in the on state. And, when the estimated vehicular body velocity Vc becomes equal to or greater than the set lower limit vehicular velocity Vs, the routine of FIG. 2, in turn, goes to the step S7 since the CPU of the vehicular run controller 20 determines that the start condition of the preceding vehicle follow-up run controller is satisfied.

Since, even at the step S7 of FIG. 2, the vehicle is running on the high frictional coefficient road surface and neither the driving force control nor the side-slip control is executed, the operation history flag register FT is reset to "0" and the routine goes from the step S7 to the step S8. At the step S8, the preceding vehicle follow-up run control is started, the preceding vehicle follow-up control processing shown in FIG. 3 being activated.

When the timer interrupt routine shown in FIG. 3 is started, the routine goes from the step S20 to the step S22 so that the preceding vehicle follow-up run control is started on the basis of the inter-vehicle distance D and the estimated vehicular body velocity Vc of the vehicle. At the step S31, the preceding vehicle follow-up run control status flag register FS is set to "1" representing that the preceding vehicle follow-up run control is being executed.

It is noted that, in the preceding vehicle follow-up run control, if no preceding vehicle is present in the front detection zone on the preceding vehicle, the set vehicular velocity is maintained so as to make the set vehicular velocity constant (called, auto-cruise control).

If another vehicle is present as the preceding vehicle running ahead of the vehicle, the target value G* of the vehicular acceleration/deceleration is calculated on the basis of the inter-vehicle distance D and the target value D* of the inter-vehicle distance. According to the target value G*, the engine output control or the braking control is executed. The preceding vehicle follow-up run control is carried out so as to maintain the target value D* of the inter-vehicle distance according to the estimated vehicular body velocity Vc.

In this way, if the preceding vehicle follow-up run status flag FS is set to "1", the routine goes from the step S3 to the step S8 shown in FIG. 2. When neither the driving force control nor the side-slip control is executed and the switch signal $S_{SET}$ is in the off state, the routine goes from the step S3 to the step S9. When neither the driving force control not the side-slip control is executed and the switch signal SSET is in the off state, the routine is directly returned to the step S1 to continue the preceding vehicle follow-up run control.

However, when the vehicle runs on the low frictional coefficient road surface such as the snowy road, the frozen road, or so forth during the follow-up run control for the vehicle to run on the high frictional road surface so that either a case where the driven wheels slip and the driving force control processing is executed or a case where the side-slip occurs during a turn of the vehicle and the side-slip control is executed.

At this time, the execution status signal SS outputted from the vehicular run controller 19 indicates the logical value of "1".

In FIG. 2, the operation history flag register FT is set to "1" transferring from the step S9 to the step S10. At the step S11, the preceding vehicle follow-up run control inhibit flag FF is set to "1".

Hence, when the preceding vehicle follow-up run control processing shown in FIG. 3 is thereafter executed, the present routine transfers from the step S20 to the step S21 to reset the preceding vehicle follow-up run control is stopped.

On the other hand, since the preceding vehicle follow-up run status flag FS is reset to "0" in the routine shown in FIG. 2, the routine transfers from the step S3 to the step S4. In this case, if either one or both of the driving force control or the side-slip control are ended, the control status signal SS outputted from the vehicular state controller 19 is returned to the logical value of "0".

Hence, the routine shown in FIG. 2 is directly returned from the step S4 to the step S6. Since the switch signal $S_{SET}$ of the set switch SWS is continued to be in the on state, the routine goes from the step S6 to the step S7. Since the operation history flag FT maintains the set state of "1", the preceding vehicle follow-up run control inhibit flag FF is maintained at the set state of "1" and the restart of the preceding vehicle follow-up run control is inhibited.

In the same way, when the vehicle is started on the low frictional coefficient road surface such as the snowy road or the frozen road, it is often the case wherein the driving force control or the drive wheel slip control (side-slip control) is executed during the start of the vehicle. Hence, the start of the preceding vehicle follow-up run control is inhibited during the start of the vehicle.

As described above, when the vehicle is to run on such a very low frictional coefficient road surface as the vehicle easily slidable, the vehicular run controller 19 executes the driving force control or the side-slip control.

When the execution (control) status signal SS indicates the logical value of "1", the preceding vehicle follow-up run control is inhibited at the preceding vehicle follow-up run controller 20. If the vehicle runs on the low frictional coefficient road surface while the preceding vehicle follow-up run control is executed and the engine output control or the braking control is executed according to the target value G* of the vehicular acceleration/deceleration calculates on the basis of the magnitude relationship between the inter-vehicle distance D and the target value D* of the inter-vehicle distance, an accurate avoidance of the slips generated on the respective four wheels 1FL through 1RR and which cause the vehicle to be inaccurate preceding vehicle follow-up run controlled state can be made.

It is noted that, when the vehicle runs on the low frictional coefficient road surface while the operation history flag FT is set to "1" inhibiting the preceding vehicle follow-up run control and runs, in turn, on the high frictional road surface so that the preceding vehicle follow-up run control is desired to be started, the main switch SWM is once changed from the on state to the off state. The routine goes from the step S1 to the step S2 shown in FIG. 2 in which the operation history flag FT is reset to "0".

Therefore, since the main switch SWM is thereafter turned on and the set switch SWS is turned on, the routine shown in FIG. 2 goes to the step S8 via the steps S1, S3, S4, S6, and S7.

Then, when the preceding vehicle follow-up run control shown in FIG. 3 is activated, the preceding vehicle follow-up run control can be restarted.

Furthermore, after the ignition switch is turned off with the vehicle stopped, the ignition switch is again turned on . At this time, since the operation history flag FT is rest to "0", it becomes possible to carry out the preceding vehicle follow-up run control on the high frictional surface coefficient road surface.

(Second Embodiment)

Figure 5:
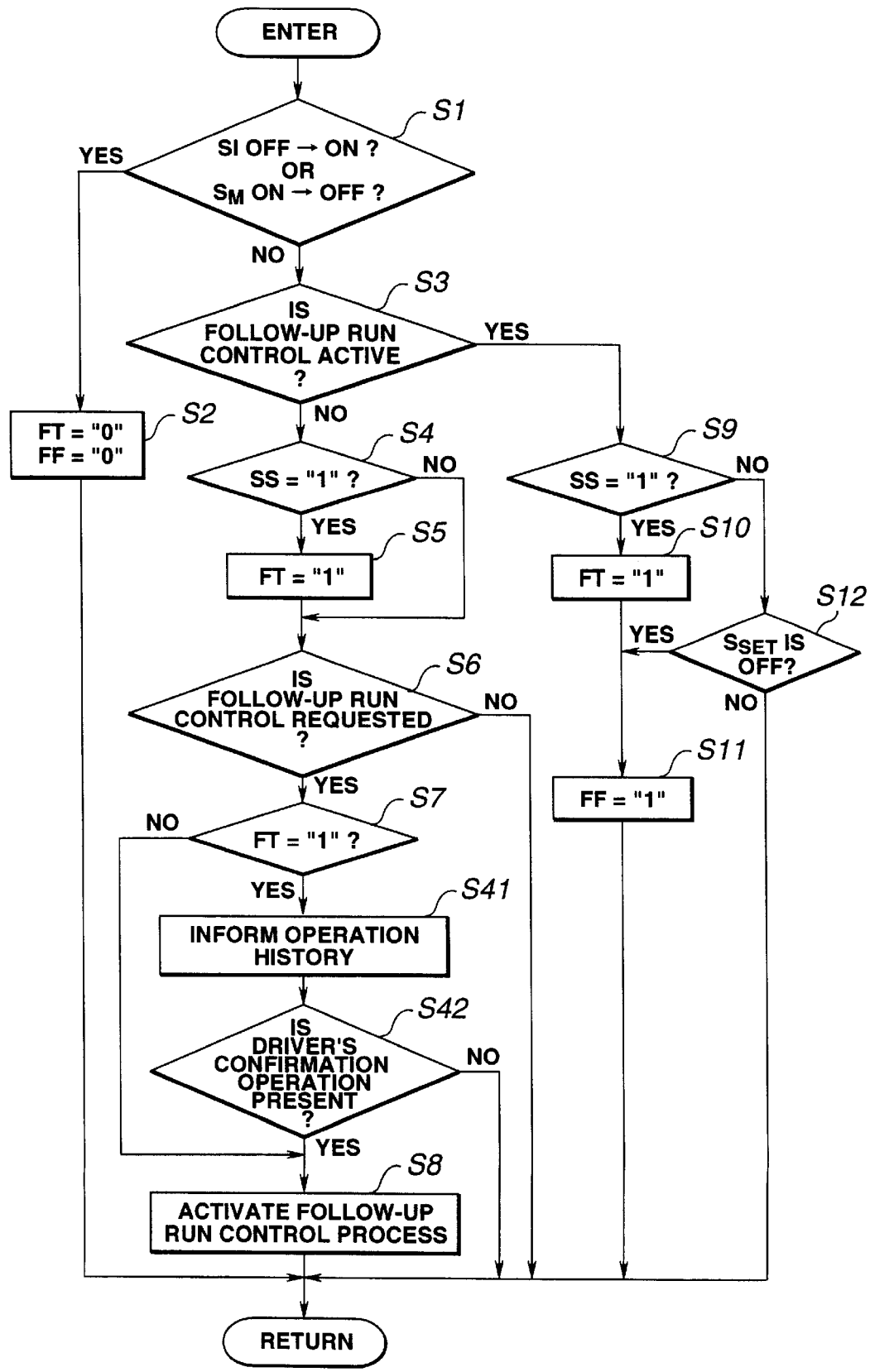
FIG. 5 is an operational flowchart representing an example of the preceding vehicle follow-up run control in a second preferred embodiment of the automatic vehicular velocity controlling apparatus according to the present invention.

FIG. 5 shows an operational flowchart representing the preceding vehicle follow-up run control managing procedure and execution in a second preferred embodiment of the automatic vehicular velocity controlling apparatus according to the present invention.

In the second embodiment, when the request to start the preceding vehicle follow-up run control is issued after the vehicle cannot help running on the low frictional coefficient road surface and it becomes the preceding vehicle follow-up run inhibit state during the preceding vehicle follow-up run control or when the preceding vehicle follow-up run control start request is issued during the start of the vehicular run on the low frictional coefficient road surface, the vehicular run controller 20 informs the vehicle driver of the running road surface being the low frictional coefficient road surface and the vehicular driver carries out a confirmation operation in response to this information. In this case, the preceding vehicle follow-up run control can be started.

It is noted that the hardware structure of the automatic vehicular velocity controlling apparatus is generally the same as that in the first embodiment shown in FIGS. 1A and 1B except that a liquid crystal display device as will be described later is provided in the vehicle. It is also noted that the preceding vehicle follow-up run control procedure shown in FIGS. 3 and 4 is applied to the second embodiment.

In details, in the second embodiment, the preceding vehicle follow-up run control managing procedure executed in the vehicular run controller 20 is shown in FIG. 5.

In FIG. 5, as compared with the corresponding FIG. 2, a step S41 in which the CPU of the controller 20 informs the vehicular driver that the vehicle is presently running on the low frictional coefficient road surface and a step S42 in which the CPU of the controller 20 determines if the confirmation operation for the above-described fact is carried out by the vehicular driver are inserted between the steps S7 and S8.

If the driver's confirmation operation is present at the step S42 (Yes), the routine of FIG. 5 goes to the step S8.

If no confirmation operation is present at the step S42 (No), the routine of FIG. 5 is returned to the step S1.

The other steps shown in FIG. 5 are the same as those shown in FIG. 2. The detailed explanations thereof will herein be omitted.

The information method at the step S42 of informing the vehicular passenger(s) including the vehicular driver that the vehicle is running on the low frictional coefficient road surface includes an information using an AV system (Audio/Visual system) having a liquid crystal display device on which a touch panel (so-called, a transparent touch sensor is disposed) is attached.

That is to say, at the step S41 of FIG. 5, the CPU of the vehicular run controller 20 issues a command to the A/V system to display such a message that "DRIVING FORCE CONTROL/SIDE-SLIP CONTROL OPERATION HISTORY IS PRESENT: CONFIRM THE ROAD SURFACE CONDITION" through the liquid crystal display device.

At the step S41, the CPU of the vehicular run controller 20 further issues a command to display a setting confirmation button and a canceling confirmation button on a video screen corresponding to the touch panel portion. If the vehicular passenger selects the setting confirmation button through the touch panel (Yes at the step S42), the routine goes from the step S42 to the step S8. If the canceling confirmation button is selected (No at the step S42), the routine is returned to the step S1.

According to the second embodiment, when the vehicle is running on the low frictional coefficient road surface so that the preceding vehicle follow-up running control is inhibited and, thereafter, the main switch SWM to carry out the preceding vehicle follow-up run control is in the on state, the CPU of the vehicular run controller 20 determines if an intention of the vehicular driver to start the preceding vehicle follow-up run control is present. When the CPU of the controller 20 confirms that the driver has the intention to start the preceding vehicle follow-up run control at the step S42, the routine goes to the step S8 to activate the preceding vehicle follow-up run control procedure shown in FIG. 3 (described in the first embodiment).

Hence, since the vehicular driver himself determines the road surface condition and can start the preceding vehicle follow-up run control according to its intention.

For example, when the vehicle has run on a relatively short road surface which is partially frozen, the preceding vehicle follow-up run control can immediately be restarted.

It is noted that, in the second embodiment, such the message that the vehicle is running on the low frictional coefficient road is displayed on the screen of the liquid crystal display unit. However, if a navigation system is mounted on the vehicle, a vocal guidance may be used to inform vocally the vehicle passenger that the vehicle is running on the low frictional coefficient road surface together with the display of such the message as described above. Furthermore, only the vocal guidance may be used omitting the message described above. It is also noted that, in the second embodiment, the confirmation button is displayed on the liquid crystal display device utilizing the touch panel. However, a confirmation button may be installed on an instrument panel of a front portion in a vehicular passenger compartment. Furthermore, the vehicular run controller 20 may promote the vehicular occupant (driver) to operate again the main switch SWM. In this case, as described in the first embodiment, the routine of FIG. 2 (FIG. 5) goes from the step S1 to the step S2 in which the operation history flag FT is reset to "0" so that the restart of the preceding vehicle follow-up run control becomes possible.

It is furthermore noted that, in the second embodiment, the liquid crystal display device is used to inform the vehicular occupant(s) of the above-described fact. However, a display device having a CRT (Cathode Ray Tube), a plasma display, or any other arbitrary display device may alternatively be used.

(Third Embodiment)

Figure 6:
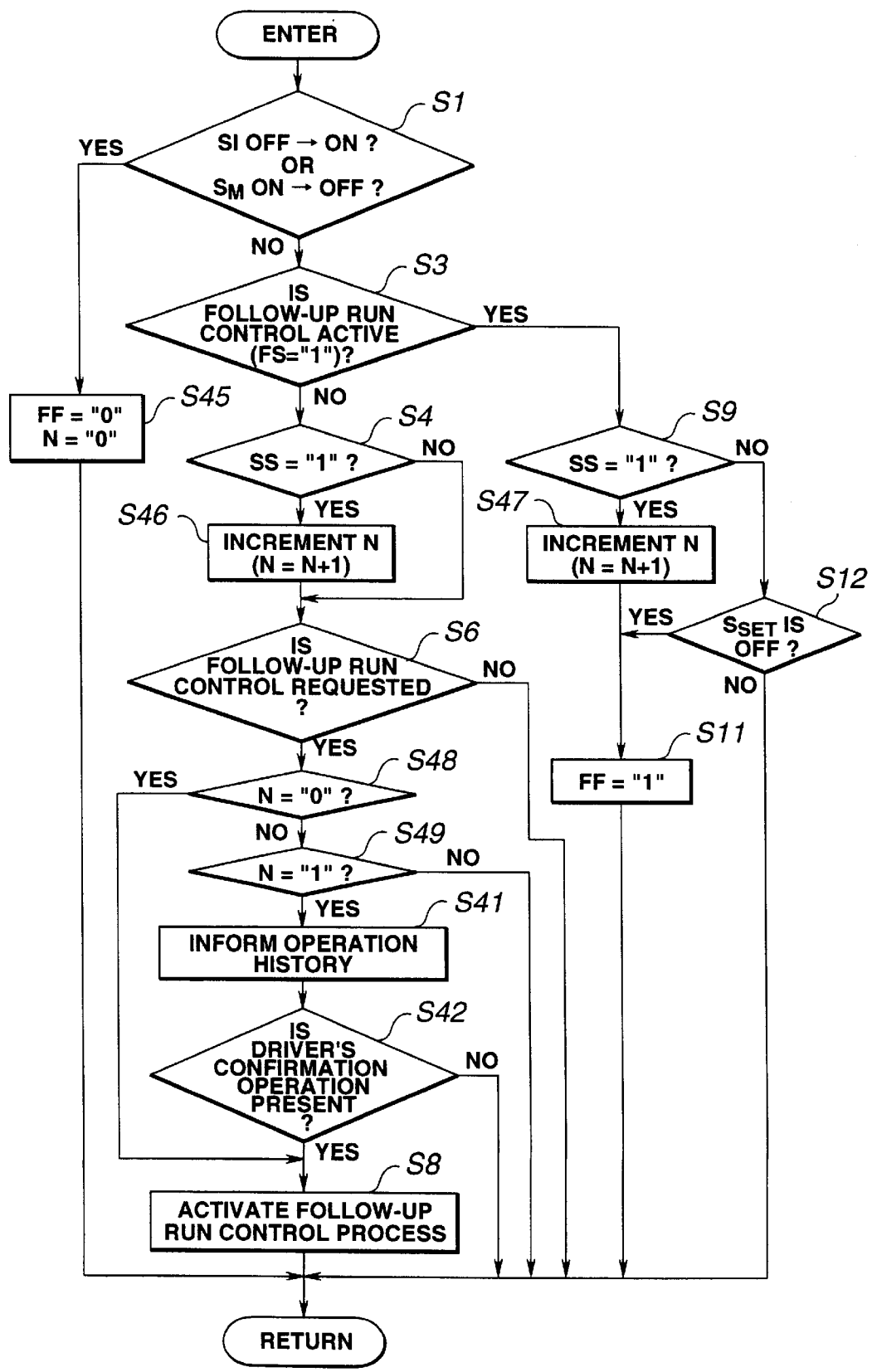
FIG. 6 is an operational flowchart representing an example of the preceding vehicle follow-up run control managing procedure of the automatic vehicular velocity controlling apparatus in a third preferred embodiment according to the present invention.

FIG. 6 shows an operational flowchart representing the preceding vehicle follow-up run control managing procedure in a third preferred embodiment of the automatic vehicular velocity controlling apparatus according to the present invention.

It is noted that the hardware structure of the automatic vehicular velocity controlling apparatus in the third embodiment is generally the same as that in the first embodiment shown in FIGS. 1A and 1B.

It is also noted that the preceding vehicle follow-up run control procedure shown in FIGS. 3 and 4 is applicable to the third embodiment.

In the third embodiment, there is a possibility that the vehicle is running on a transient (a temporary) low frictional coefficient road surface when the number of times either the driving force control or the side-slip control has been executed is below a predetermined number of times. Hence, after the information of the vehicular run on the low frictional coefficient road surface to the vehicular driver, the controller 20 determines whether the preceding vehicle follow-up run control should be continued. When the above-described number of times is equal to or greater than the predetermined number of times the controller 20 determines that the vehicle is running continually or continuously on the low frictional coefficient road surface and the preceding vehicle follow-up run control is inhibited.

That is to say, in the third embodiment, as shown in FIG. 6, in the procedure of FIG. 5 in the second embodiment described above, the processing of the step S2 is different from that shown in FIG. 2 in such a way that the operation number of times N on either the driving force control or the side-slip control is cleared to "0".

Together with this clear operation for N, the preceding vehicle follow-up run control inhibit flag FF is reset to "0" at a new step S45 in place of the step S2 shown in FIG. 5.

In addition, the steps S5 and S10 shown in FIG. 5 are replaced with steps S46 and S47 shown in FIG. 6.

At each of the steps S46 and S47, the CPU of the controller 20 increments the number of times N either the driving force control or the side-slip control has been executed (the number of operation times N).

In addition, the step S7 shown in FIG. 5 is omitted in the third embodiment. In place of the omitted step S7, a new step S48 in which the CPU of the controller 20 determines whether the number of operation times N is "0" and a new step S49 in which the CPU of the controller 20 determines if the number of operation times N is "1" are provided.

If the result of determination at the step S49 indicates N=0, the routine jumps from the step S48 to the step S8. If the result of determination at the step S48 indicates N>0 (No), the routine goes to the step S49.

If N=1 at the step S49 (Yes), the routine goes to the step S41. If N>1 at the step S49 (No), the routine is returned to the step S1. The other steps shown in FIG. 6 are the same as those shown in FIG. 5. The detailed explanations thereof will herein be omitted.

In the third embodiment, whenever the vehicular state controller 19 executes the driving force control or the side-slip control when the preceding vehicle follow-up run control is to be started, the control status signal SS from the vehicular state controller 19 indicates the logical value of "1". Whenever the control status signal SS indicates the logical value of "1", the number of operation times N at the step S46 is incremented.

Hence, when the preceding vehicle follow-up run control is started, the routine shown in FIG. 6 goes from the step S1 to the step S45 in which the number of operation times N is cleared to "0". Thereafter, when neither the driving force control nor the side-slip control is executed, the number of operation times N is maintained at "0". Hence, the routine shown in FIG. 6 goes from the step S48 to the step S8 in which the preceding vehicle follow-up run control is activated so that the preceding vehicle follow-up run control shown in FIG. 3 is started.

Then, after the preceding vehicle follow-up run control is started, the vehicle is running on the low frictional coefficient road surface to execute either the driving force control or the side-slip control. At this time, the routine goes from the step S9 to the step S11 via the step S47. Then, the preceding vehicle follow-up run control inhibit flag is set to "1" and the preceding vehicle follow-up run control is inhibited. Thereafter, when the preceding vehicle follow-up run control is restarted, the routine goes from the step S4 to the step S4 to the step S46 while either the driving force control or the side-slip control is executed. At the step S46, the number of operation times N is incremented by one.

Hence, the routine shown in FIG. 6 goes to the step S49 via the step S48 and goes to the step S41. Since N=1, the routine goes to the step S41. In the same way as the second embodiment, the operation history is informed to the vehicular occupant. When the controller 20 recognizes the driver's confirmation operation at the step S42, the routine goes to the step S8 in which the preceding vehicle follow-up run control is activated to start the preceding vehicle follow-up run control routine shown in FIG. 3.

However, after the preceding vehicle follow-up run control is started again, either the driving force control or the side-slip control is executed so that the preceding vehicle follow-up run control is halted and, thereafter, the request to re-start the preceding vehicle follow-up run control is present. Or when either the driving force control or the side-slip control is executed before the above-described request is present so that the number of operation times N is incremented and is raised by two or more, the routine shown in FIG. 6 goes to the steps S47 and S48 without passing the step S8 and is returned to the step S1. Hence, the preceding vehicle follow-up run control is not activated and the start of the preceding vehicle follow-up run control is continued to be inhibited.

Hence, in the third embodiment, either the driving force control or the side-slip control is executed during the start of the preceding vehicle follow-up run control so that the number of operation times N is sequentially incremented. If the number of operation times N is "0", the preceding vehicle follow-up run control can unconditionally be started. If N="1", the preceding vehicle follow-up run control is started upon the receipt of the vehicular driver's decision. Furthermore, if N≧2, the CPU of the controller 20 determines that the vehicle is running continuously or discretely on the low frictional coefficient road surface and the preceding vehicle follow-up run control is inhibited. Consequently, an optimum managing on the preceding vehicle follow-up run control can be achieved according to the road surface situation on which the vehicle runs.

It is noted that, in the third embodiment, the number of operation times either the driving force control or the side-slip control has been executed has counted during the start of the preceding vehicle follow-up run control.

However, the road surface situation may be determined according to the number of control operation times per unit of time.

Alternatively, when a time duration for which either the driving force control or the side-slip control is executed is measured and the time duration is below a set time duration (for example, approximately 0.5 seconds), the preceding vehicle follow-up run control may be started after the confirmation operation by the vehicle driver. If the measured time duration is equal to or longer than the set time duration, the preceding vehicle follow-up run control may be inhibited.

It is noted that, in each of the first, second, and third embodiment, the vehicular state controller 19 carries out both of the driving force control and the side-slip control. However, either one of these preventive controls may be carried out. In summary, the controller 19 may carry out such the control that is executed when the vehicle is running on the low frictional coefficient road surface.

(Fourth Embodiment)

Figure 7:
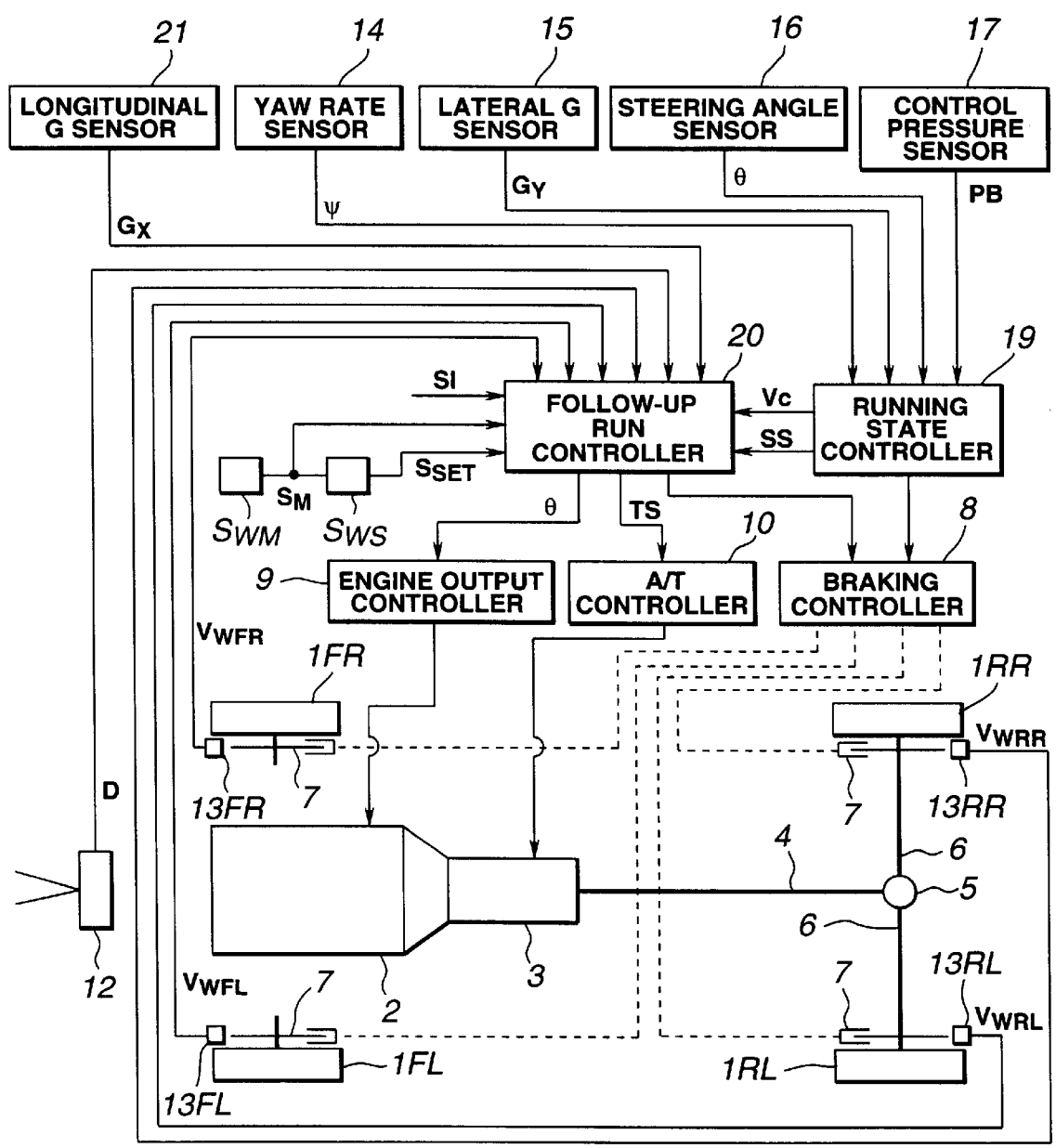
FIG. 7 is a schematic configuration of the automatic vehicular velocity controlling apparatus in a fourth preferred embodiment according to the present invention.
Figure 8:
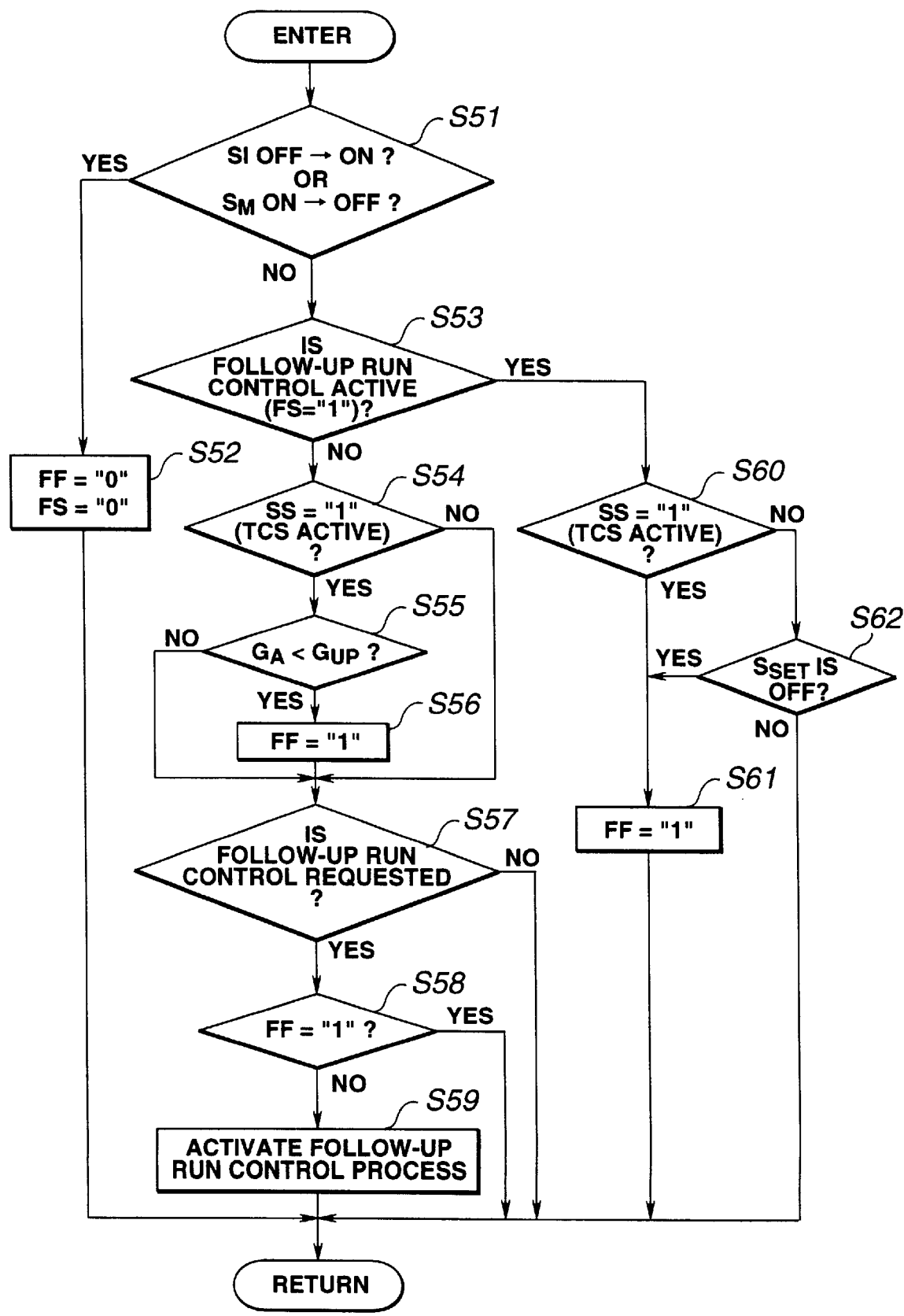
FIG. 8 is an operational flowchart representing the preceding vehicle follow-up run control managing procedure in the fourth preferred embodiment of the automotive vehicular velocity controlling apparatus according to the present invention shown in FIG. 7.

FIGS. 7 and 8 show a schematic circuit block diagram and an operational flowchart of the preceding vehicle follow-up run control managing procedure of the automatic vehicular velocity controlling apparatus in a fourth preferred embodiment according to the present invention.

In the fourth embodiment, the CPU of the vehicular run controller 20 determines that the vehicle is running on the road surface having the low frictional coefficient when the driving force control is being executed with a predetermined acceleration condition satisfied and the execution and the start of the preceding vehicle follow-up run control is inhibited.

In addition, in the fourth embodiment, as shown in FIG. 7, a longitudinal acceleration sensor 21 is newly disposed to detect an acceleration in a longitudinal direction of the vehicle body in addition to the sensors 14, 15, 16, and 17 installed as shown in FIG. 1A.

A detected longitudinal acceleration (G) Gx by means of the longitudinal acceleration sensor 21 is inputted to the preceding vehicle follow-up run (vehicular run) controller 20. Furthermore, the vehicular state controller 19 outputs the control state signal SS having the logical value of "1" to the vehicular run controller 20 when only the driving force control is being executed.

When the vehicular run controller 20 determines that the acceleration value GA during the vehicular acceleration detected by the longitudinal G sensor 21 when the preceding vehicle follow-up run control managing procedure shown in FIG. 8 is executed and the driving force control is determined to be executed is less than a preset acceleration $G_{UP}$ corresponding to a maximum acceleration at a time point when the vehicle runs on the low frictional coefficient road surface, the CPU of the controller 20 determines that the vehicle runs on the low frictional coefficient road surface and inhibits the start and the execution of the preceding vehicle follow-up run control.

The other structure and the preceding vehicle follow-up run control interrupt routine in the fourth embodiment are the same as those described in the first embodiment with reference to FIGS. 1A, 1B, and 3. Hence, the detailed description thereof will herein be omitted.

In the preceding vehicle follow-up run managing procedure, as shown in FIG. 8, the CPU of the controller 20 determines if the status of the switch signal SI of the ignition switch is changed from the off state to the on state or if the status of the switch signal $S_M$ is changed from the on state to the off state at a step S51.

If the result of determination at the step S51 indicates that the switch signal SI is changed from the off state to the on state or the switch signal $S_M$ is changed from the on state to the off state (Yes), the routine goes to a step S52. At the step S52, the preceding vehicle follow-up run control inhibit flag FF representing whether the follow-up run control should be inhibited or enabled is reset to "0" to enable the follow-up run control and the follow-up run control status flag FS representing whether the follow-up run control is being executed or not is reset to "0" to represent no execution of the preceding vehicle follow-up run control.

Then, the routine is returned to the step S51.

If the result of determination at the step S51 indicates that neither the switch signal SI is changed from the off state nor the switch signal SM is changed from the on state to the off state (No), the routine goes to a step S53.

At the step S53, the CPU of the controller 20 determines if the preceding vehicle follow-up run control status flag FS is set to "1" representing that the preceding vehicle follow-up run control is being executed. If FS="1" (YES) at the step S53, the routine goes to a step S60. If FS="0" (No) at the step S53, the routine goes to a step S54 determining that the preceding vehicle follow-up run control is inhibited.

At the step S54, the control status signal SS from the vehicular state controller 19 is read to determine if the control status signal SS indicates the logical value of "1".

If SS="1" (Yes) at the step S54, the CPU of the controller 20 determines that the driving force control is being executed and the routine goes to a step S55.

At the step S55, the CPU of the controller 20 reads the acceleration value $G_A$ detected by means of the longitudinal acceleration sensor 21 to determine if $G_A < G_{UP}$, wherein $G_{UP}$ denotes the preset acceleration which corresponds to the maximum longitudinal acceleration when the vehicle runs on the road surface having the low frictional coefficient and, for example, indicates approximately 0.6 G.

If $G_A \geq G_{UP}$ (No) at the step S55, the CPU of the controller 20 determines that the vehicle runs on the high frictional coefficient road surface since a larger acceleration than the preset acceleration $G_{UP}$ is developed and the routine goes to a step S57.

If $G_A < G_{UP}$ (Yes) at the step S55, the CPU of the controller 20 determines that the vehicle runs on the low frictional coefficient road surface since a smaller acceleration than the preset acceleration $G_{UP}$ is developing and the routine goes to a step S56. At the step S56, the preceding vehicle follow-up run control inhibit flag FF is set to "1" and the routine goes to a step S57.

At the step S57, the CPU of the controller 20 reads the switch signal $S_{SET}$ of the set switch SWS to determine if there is the request by the vehicular driver to start the preceding vehicle follow-up run control with the set signal $S_{SET}$ turned on. If the switch signal $S_{SET}$ is turned off (No at the step S57), the CPU of the controller 20 determines that there is no request to start the preceding vehicle follow-up run control and the routine is returned to the step S51. If the switch signal $S_{SET}$ is turned on at the step S57 (Yes), the CPU of the controller 20 determines that there is the request by the driver described above and the routine goes to a step S58 when the estimated vehicular body velocity Vc is equal to or greater than the set lower limit value Vs of the vehicular velocity.

At the step S58, the CPU of the controller 20 determines if the preceding vehicle follow-up run control inhibit flag FF is set to "1".

If this flag FF is reset to "0", the CPU of the controller 20 determines that the vehicle is running on the high frictional coefficient road surface and it is possible for the vehicle to achieve the stable follow-up run control to the preceding vehicle if the preceding vehicle is present and the routine shown in FIG. 8 goes to a step S59. At the step S59, the preceding vehicle follow-up run control routine shown in FIG. 3 is activated.

Then, the routine is returned to the step S51.

On the other hand, at the step S60, since at the step S53 FS="1", the CPU of the controller 20 reads the control status signal SS from the vehicular state controller 19 from the vehicular state controller 19 to determine whether its logical value of SS indicates "1" or "0". If SS="1" (yes) at the step S60, the routine goes to a step S61. At the step S61, the preceding vehicle follow-up run control inhibit flag FF is set to "1" in the same way as the step S56 and the routine is returned to the step S51.

If the result of determination at the step S60 indicates that SS="0" (No), the routine goes to a step S62.

At the step S62, the CPU of the vehicular run controller 20 determines if the switch signal $S_{SET}$ of the set switch SWS is turned off. If the set switch SSET indicates the off state (Yes), the CPU of the controller 20 determines that there is a request by the vehicular driver to halt the preceding vehicle follow-up run control and the routine goes to the step S61. If the switch signal $S_{SET}$ indicates that the preceding vehicle follow-up run control should be continued (No) at the step S62, the routine is returned to the step S51.

In the fourth embodiment, in the same manner as described in the first embodiment, when the ignition switch is turned to ON to start the engine 2, the routine in FIG. 8 goes to both of the step S52 via the step S51 to initialize both of the preceding vehicle follow-up run control inhibit flag FF and the preceding vehicle follow-up run control status flag FS in "0" state.

Thereafter, when in order to start the vehicle, the vehicle is accelerated on the road surface having the high frictional coefficient and, thus, the driven wheels slip, the vehicular state controller 19 executes the driving force control.

However, since, at this time, the longitudinal acceleration $G_A$ becomes equal to or larger than the preset acceleration value GUP, the routine of FIG. 8 jumps from the step S55 to the step S57. The preceding vehicle follow-up run control inhibit flag FF is not set to "1".

At this time, if the main switch SWM and the set switch SWS are turned on and the switch signal $S_{SET}$ is turned on, the request to start the preceding vehicle follow-up run control is issued. If the estimated vehicular body velocity Vc becomes equal to or greater than the set lower limit value Vs of the vehicular velocity, the routine of FIG. 8 goes to the step S58.

In this case, since the preceding vehicle follow-up run control inhibit flag FF is maintained at the reset state of "0", the routine goes to the step S59.

At the step S59, the preceding vehicle follow-up run control procedure shown in FIG. 3 is activated to start the preceding vehicle follow-up run control to make the detected inter-vehicle distance D(n) coincident with the inter-vehicle distance D(n)*.

However, when the vehicle is started on the low frictional coefficient road surface, the driven wheels slip occur, and the vehicular state controller 19 executes the driving force control, the routine of FIG. 8 goes from the step S54 to the step S55.

Since the vehicle is running on the low frictional coefficient road surface, the longitudinal acceleration $G_A$ denoted by the longitudinal acceleration sensor 21 is maintained at a value less than the preset acceleration value $G_{UP}$, the routine goes to the step S56. At the step S56, the preceding vehicle follow-up run inhibit flag FT is set to "1".

When the estimated vehicular body velocity Vc has reached to the set lower limit value Vs of the vehicular velocity, the routine goes to the step S56.

Since the preceding vehicle follow-up run inhibit flag FF is set to "1" at the step S56, the preceding vehicle follow-up run control procedure shown in FIG. 3 is not activated and the start of the preceding vehicle follow-up run control is inhibited.

On the other hand, when the vehicle is started on the high frictional coefficient road surface and the driving force control is executed with the preceding vehicle follow-up run control executed, the CPU of the controller 20 determines that the vehicle is falsely running on the low frictional road surface and the preceding vehicle follow-up run control inhibit flag FF is set to "1". In this case, the preceding vehicle follow-up run control procedure shown in FIG. 3 is ended.

In this state, the vehicle is, in turn, entered into the run on the high frictional coefficient road surface. At this time, if the main switch SWM is turned off and is again turned on, the preceding vehicle follow-up run control inhibit flag FF is reset to "0" so that the preceding vehicle follow-up run control can be restarted.

As described hereinabove, in a case where the driven wheels slip, the driving force control (TCS in this case) is executed by the vehicular state controller 19, and the developed longitudinal acceleration $G_A$ is smaller than the preset acceleration value $G_{UP}$, the CPU of the controller 20 determines that the vehicle is running on the low frictional coefficient road surface and the accurate control over the following-up to the preceding vehicle cannot be made any more.

To prevent this from occurring, the start of the preceding vehicle follow-up run control can be inhibited. Thus, a more accurate detection of the vehicular running state on the low frictional coefficient road surface can be made.

(Fifth Embodiment)

Figure 9:
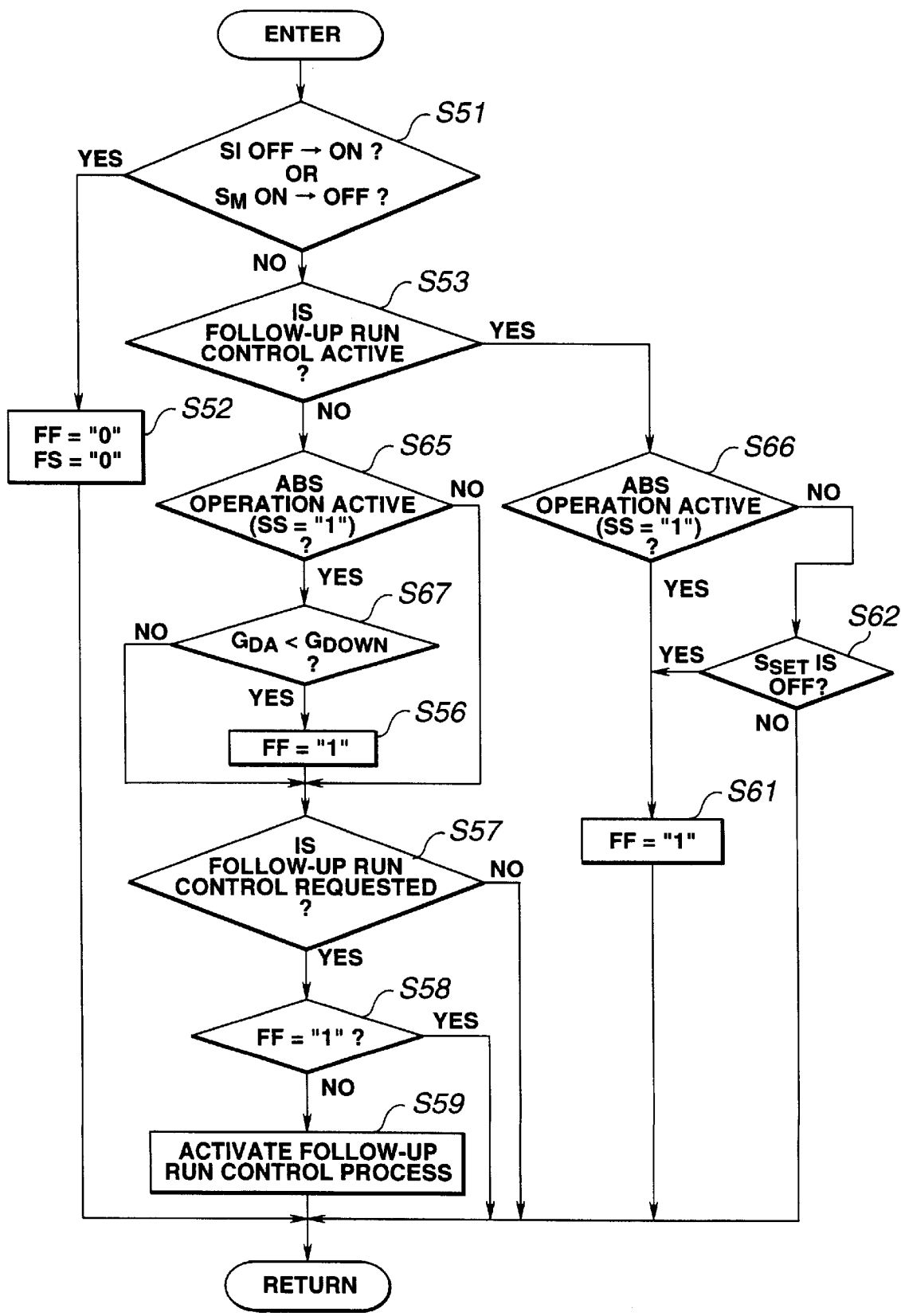
FIG. 9 is an operational flowchart representing an example of the preceding vehicle follow-up run managing control procedure in a fifth preferred embodiment of the automatic vehicular velocity controlling apparatus.

FIG. 9 shows an operational flowchart representing the preceding vehicle follow-up run control managing procedure in a fifth preferred embodiment according to the present invention.

In the fifth embodiment, when the anti-lock braking control is executed, the CPU of the vehicular run controller 20 inhibits the start of the preceding vehicle follow-up run control when determining that the vehicle is running on the low frictional coefficient road surface with the vehicular deceleration smaller than a preset deceleration.

In the fifth embodiment, when the logical value of "1" of the control status signal SS is received indicating that the anti-lock brake control is being executed from the vehicular state controller 19, the vehicular run controller 20 executes the preceding vehicle follow-up run control managing procedure shown in FIG. 9.

As shown in FIG. 9, the steps S54 and S60 shown in FIG. 8 are replaced with steps S65 and S66. In addition, the step S55 shown in FIG. 8 is transferred to a step S67 shown in FIG. 9. The other steps shown in FIG. 9 are the same as those shown in FIG. 8. The steps S65 and S66 have the contents of determining if the anti-lock braking control (ABS) is being executed. The step S67 has the content of determining whether the deceleration $G_{DA}$ detected by means of the longitudinal acceleration sensor 21 is smaller than a preset deceleration $G_{DOWN}$ (for example, approximately 0.2 G) which corresponds to a maximum deceleration on the low frictional coefficient road surface.

In the fifth embodiment, before the preceding vehicle follow-up run control is executed, the anti-lock brake control is executed.

When the vehicular deceleration during the execution of the anti-lock braking control is equal to or greater than the preset deceleration value $G_{DOWN}$ corresponding to the maximum deceleration on the low frictional coefficient road surface, the CPU of the vehicular run controller 20 can determine that the high frictional coefficient road surface. If $G_{DA}<G_{DOWN}$, the CPU of the controller 20 can determine that the vehicle is running on the low frictional coefficient road surface. The start of the preceding vehicle follow-up run control during the vehicular run on the low frictional coefficient road surface can accurately be inhibited.

In each of the fourth and fifth embodiments, the longitudinal G sensor 21 is used to detect the vehicular acceleration or deceleration. However, a differentiation of the estimated vehicular velocity Vc (dVc/dt) or a variation rate of the estimated vehicular velocity Vc per unit of time may be used to detect the vehicular acceleration or deceleration.

(Sixth Embodiment)

Figure 10:
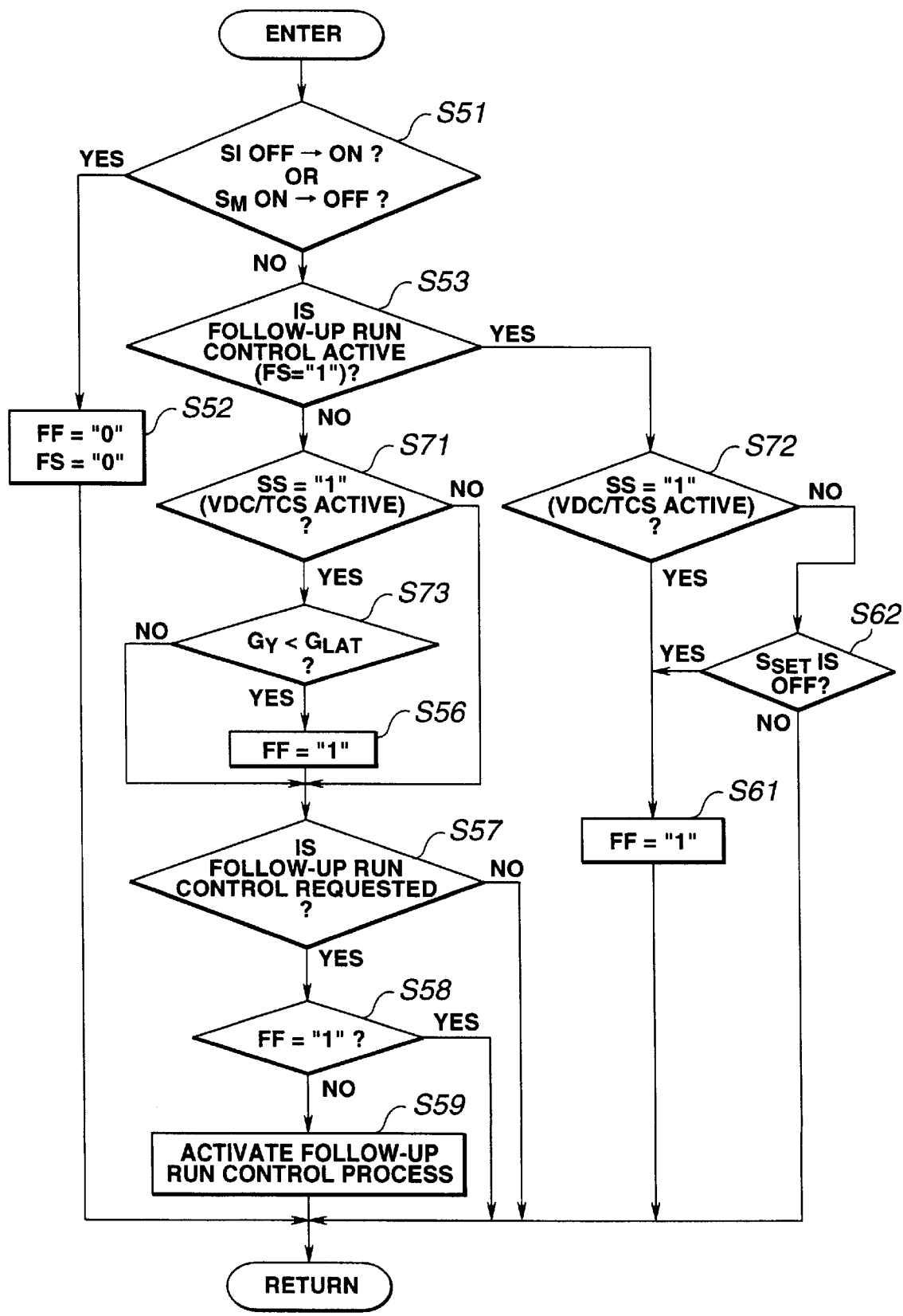
FIG. 10 is an operational flowchart for explaining an example of the preceding vehicle follow-up run control managing procedure in a sixth preferred embodiment according to the present invention.

FIG. 10 shows an operational flowchart representing the preceding vehicle follow-up run control managing procedure executed in a sixth preferred embodiment of the automatic vehicular velocity controlling apparatus according to the present invention.

It is noted that the hardware structure of the sixth embodiment is the same as that shown in FIG. 7 and the preceding vehicle follow-up run control procedure shown in FIG. 3 is applicable to the sixth embodiment.

In the sixth embodiment, when a lateral acceleration developed when the side-slip control is executed is smaller than a preset acceleration corresponding to a maximum lateral acceleration of the vehicular run on the low frictional coefficient road surface, the CPU of the vehicular run controller 20 determines that the vehicle is running on the low frictional coefficient road surface and inhibits the start of the preceding vehicle follow-up run control.

In details, in the sixth preferred embodiment, a lateral acceleration $G_Y$ detected by means of the lateral G sensor 15 is inputted into the preceding vehicle follow-up run controller 20 as well as the vehicular state controller 19. The vehicular run controller 20 executes the preceding vehicle follow-up run control managing procedure shown in FIG. 10.

In the sixth embodiment, the steps S54 and S60 shown in FIG. 8 are replaced with steps S71 and S72 shown in FIG. 10. The content of the step S55 shown in FIG. 8 is replaced with a new step S73.

The other steps shown in FIG. 10 are the same as those shown in FIG. 8.

The steps S71 and S72 have the contents of determining if the side-slip control has been executed.

The step S73 has the content of determining if the lateral acceleration $G_Y$ detected by means of the lateral G sensor 15 is smaller than the preset lateral acceleration $G_{LAT}$ (for example, approximately 0.2 G) corresponding to the maximum lateral acceleration on the low frictional coefficient road surface.

In the sixth preferred embodiment, suppose that before the preceding vehicle follow-up run control is started, the side-slip control is executed. If the lateral acceleration $G_Y$ during the execution of the side-slip control is equal to or greater than the preset lateral acceleration $G_{LAT}$ corresponding to the maximum lateral acceleration on the low frictional coefficient road surface, the CPU of the vehicular run controller 20 can determine that the vehicle is running on the high frictional coefficient road surface. If the lateral acceleration $G_Y$ is smaller than the preset deceleration $G_{LAT}$, the CPU of the vehicular run controller 20 can determine that the vehicle is running on the low frictional coefficient road surface. The start of the preceding vehicle follow-up run control can be inhibited without failure.

It is noted that, in the sixth embodiment, the lateral G sensor 15 is used to detect the lateral acceleration developed on the vehicle body.

However, the lateral acceleration $G_Y$ may be calculated in accordance with the following equation (1A) from the estimated vehicular body velocity Vc and a radius of turn R based on the steering angle θ. Furthermore, the lateral acceleration $G_Y$ may be calculated on the basis of the yaw rate ψ detected by the yaw rate sensor 14.

$$G_Y = Vc^2/R \quad (1A).$$

In addition, in each of the fourth, fifth, and sixth embodiment, the start of the preceding vehicle follow-up run control is inhibited when the low frictional coefficient road surface is detected. However, after the information of the vehicular run on the low frictional coefficient road surface has been carried out to the vehicular occupant(s), the start of the preceding vehicle follow-up run control may be carried out or a specification of the control may be varied according to the number of times N the low frictional coefficient road surfaces has been detected as described in the second or third embodiment.

It is noted that a combination of features in the fourth, fifth, and sixth embodiments can be achieved.

It is also noted that a combination of the features of the second embodiment and the fourth embodiment (the fifth embodiment or the sixth embodiment) is possible and a combination of the features of the third embodiment with those of the fourth (fifth or sixth) embodiment is possible.

(Seventh Embodiment)

Figure 11:
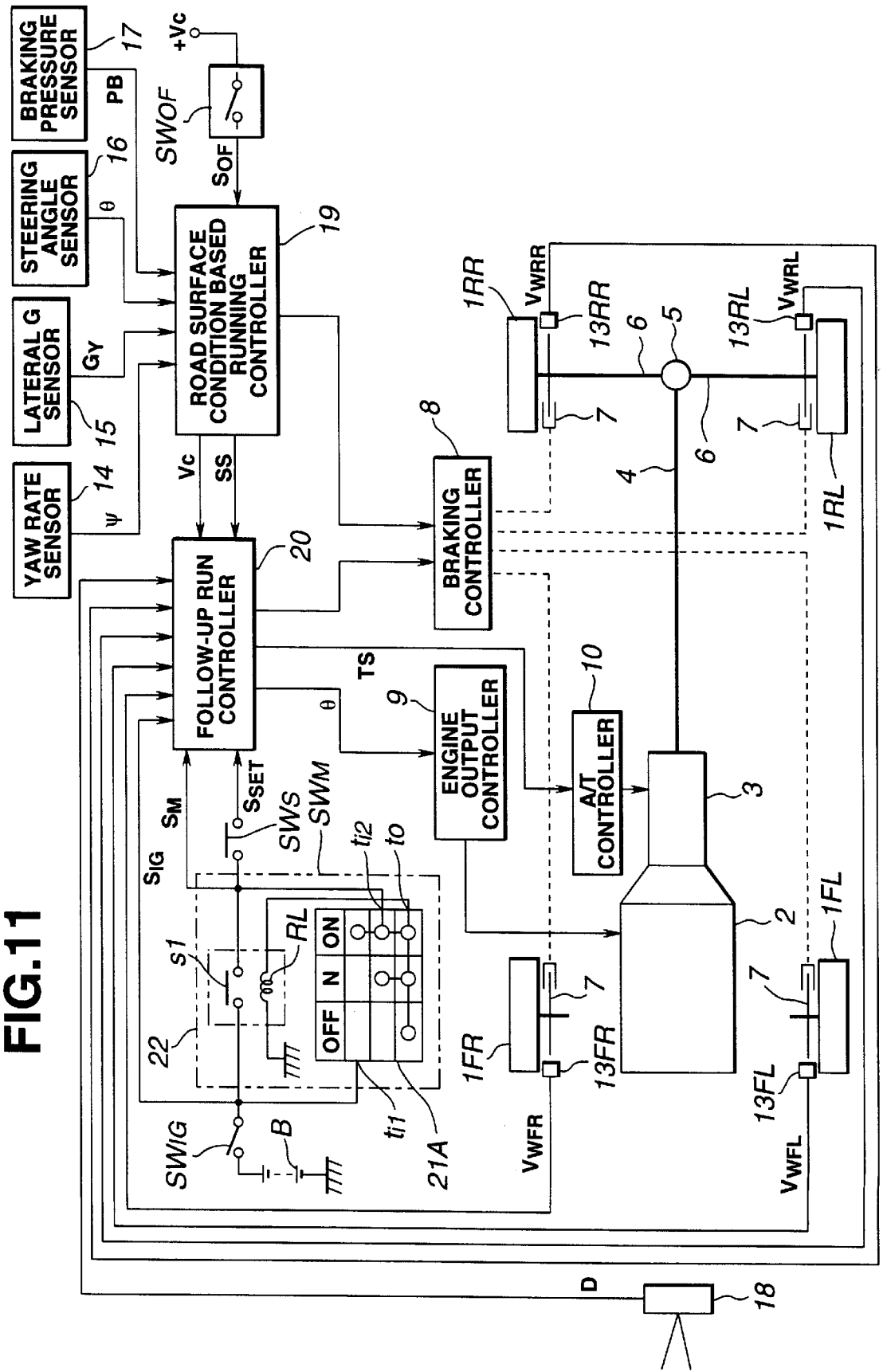
FIG. 11 is a schematic configuration of a seventh preferred embodiment of the automatic vehicular velocity controlling apparatus according to the present invention.
Figure 12:
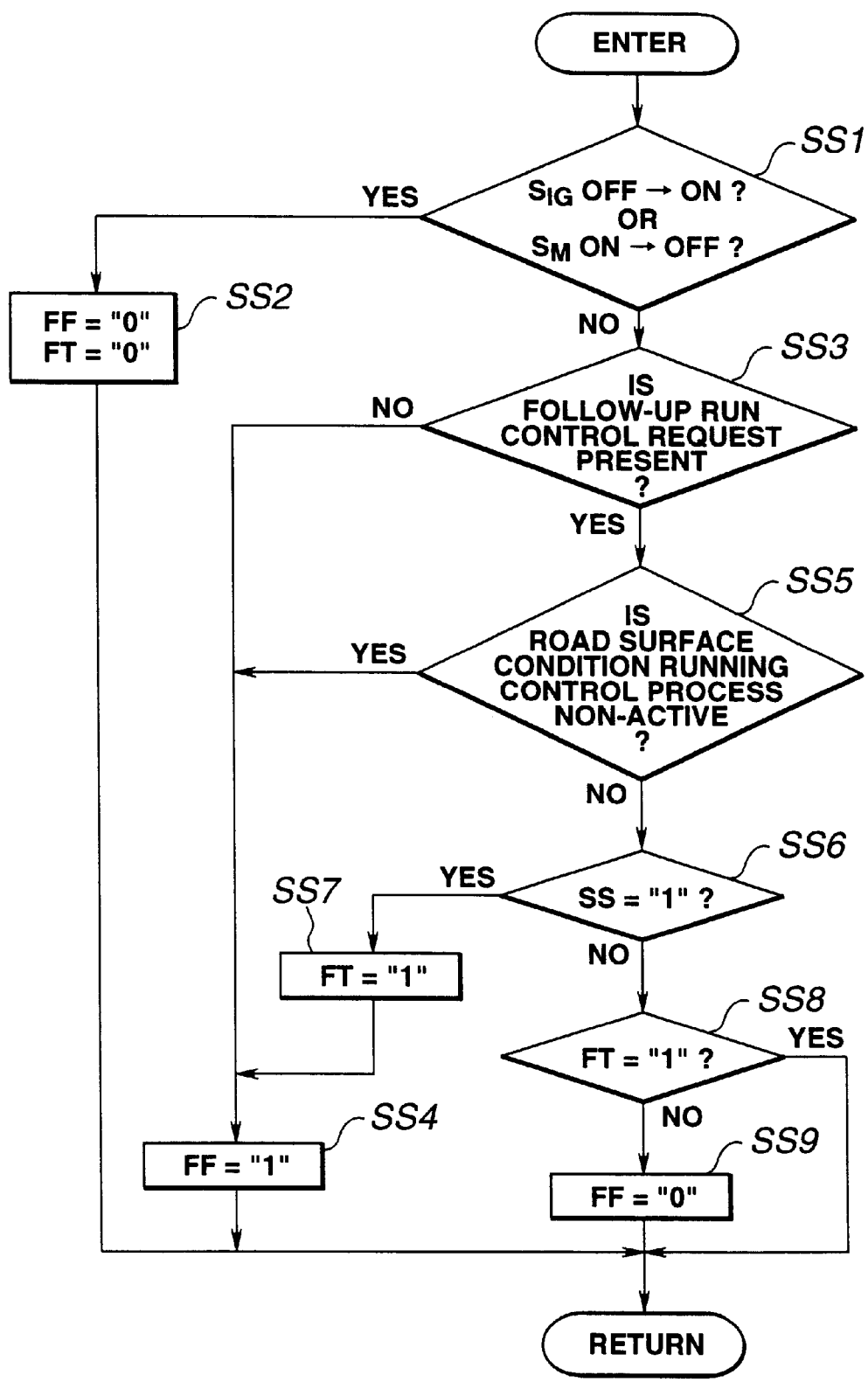
FIG. 12 is an operational flowchart representing an example of the preceding vehicle follow-up run control managing procedure in the seventh preferred embodiment of the automatic vehicular velocity controlling apparatus according to the present invention.
Figure 13:
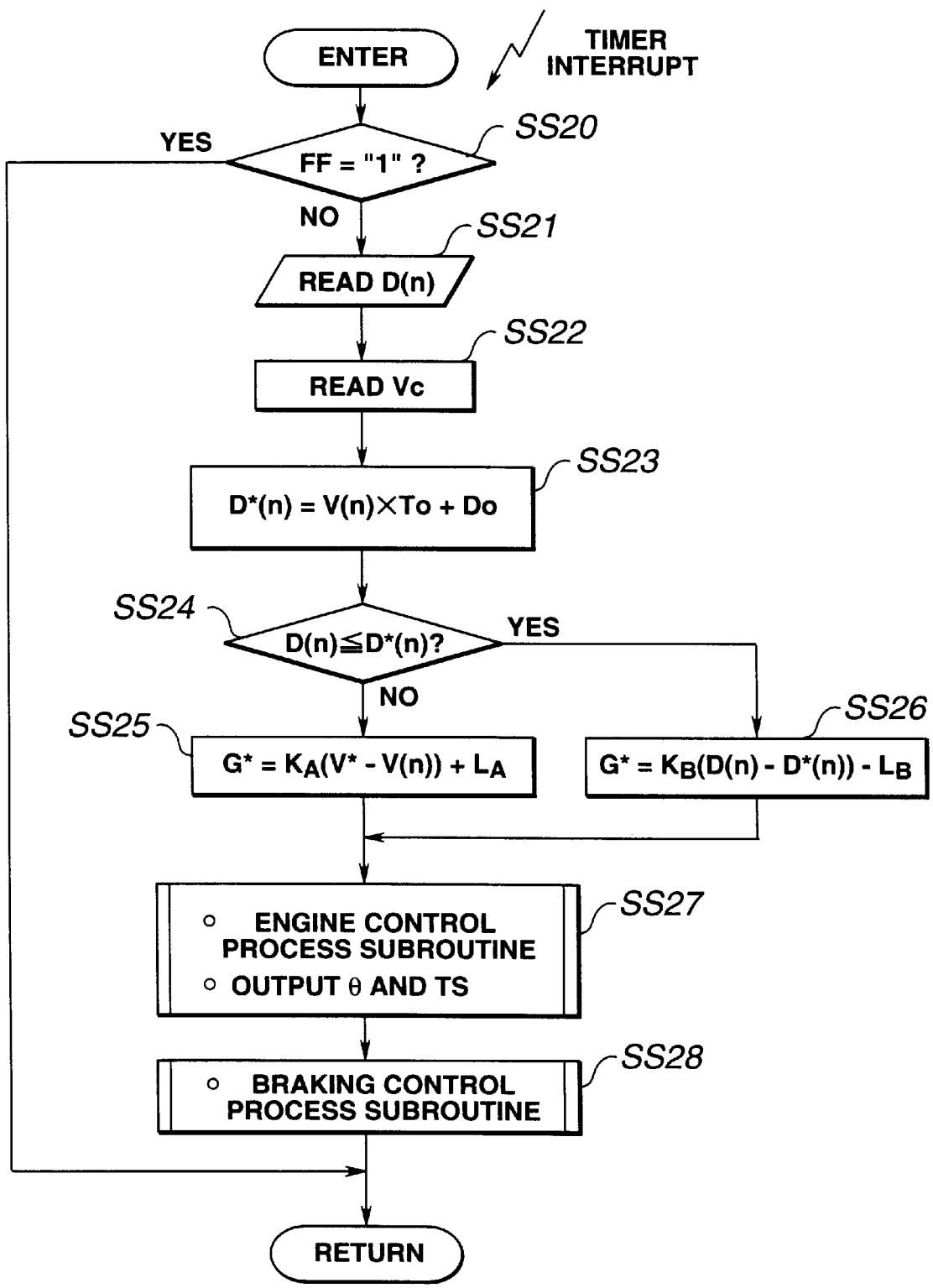
FIG. 13 is an operational flowchart representing an example of the preceding vehicle follow-up run control procedure in the seventh embodiment shown in FIG. 11.

FIGS. 11, 12, and 13 show a seventh preferred embodiment of the automatic vehicular velocity controlling apparatus according to the present invention.

Since the structure of the automatic vehicular velocity controlling apparatus shown in FIG. 11 is generally the same as that shown in FIG. 1A described in the first embodiment, difference points between FIGS. 11 and 1A will hereinafter be described.

In the vehicular state controller 19, the anti-lock brake control (ABS) is to be executed.

In the anti-lock braking control (ABS), the CPU of the vehicular state controller 19 calculates each road wheel slip rate on the basis of the respective wheel velocities VWFL through VWRR detected by means of each wheel velocity sensor 13FL through 13RR and the estimated vehicular body velocity Vc, calculates wheel accelerations/decelerations for the respective road wheels 1FL through 1RR, outputs a control command value to the braking controller 8 to make the respective wheel slip rates coincident with the target value of the wheel slip on the basis of these calculated parameters so as to control the braking pressures of the disc brakes 7 of the respective road wheels.

In addition, in the driving force control, the CPU of the vehicular state controller 19 calculates the slip rates on the driven wheels from the wheel velocities VWRL and VWRR on the driven wheels 1RL and 1RR, outputs the control command value to the braking controller 8 so that the calculated slip rates are smaller than the target slip rate so as to control the braking pressure on the disc brakes 7 of the respectively corresponding road wheels.

For the control on the side-slip, the CPU of the vehicular state controller 19 executes the same side-slip control as described in the first embodiment.

In addition, in the vehicular state controller 19, the anti-lock brake control procedure is always enabled to be executed and both of the driving force control procedure and the side-slip control procedure are in the operation state when a functional off switch $SW_{OF}$ used to countermeasure a stack and connected to the controller 19 is continued in the off state and are in non-operation state when the functional off $SW_{OF}$ is in the on state.

The vehicular run controller 20 receives: the inter-vehicle distance D detected by the inter-vehicle distance sensor 18; the control status (the execution state) signal SS representing whether either the driving force (suppression) control or the side-slip (suppression) control is being executed from the vehicular state controller 19; the estimated vehicular body velocity Vc outputted from the controller 19; the switch signal SIG of the ignition switch SWIG connected to a vehicular battery B; the switch signals SM and $S_{SET}$ of the main switch SWM and the set switch SWS; and a switch signal $S_{OF}$ of the functional off switch $SW_{OF}$ against the vehicular state controller 19.

In the preceding vehicle follow-up run controller 20, the vehicular run controller 20 performs a control over the braking controller 8, the engine output controller 9, an automatic transmission controller 10 on the basis of the inter-vehicle distance D detected by means of the inter-vehicle distance sensor 18 and the vehicular body velocity Vc inputted from the road surface situation dependent vehicular run controller 19 (the road surface situation dependent vehicular run controller corresponds to the vehicular state controller).

Hence, the vehicular run controller 20 performs the preceding vehicle follow-up run control such that the vehicle is following up the preceding vehicle maintaining an appropriate inter-vehicle distance to the preceding vehicle running ahead of the vehicle.

In addition, when the execution state signal SS having the logical value of "1" is received from the vehicular state controller 19, the CPU of the vehicular run controller 20 sets the operation history flag FT to "1" representing that the suppression control on the road surface situation dependent vehicular run processing has been executed, forcefully ends the preceding vehicle follow-up run control which has been executed, and inhibits the start of the preceding vehicle follow-up run control.

The inhibit means that a disable interrupt instruction is issued to disable an interrupt request.

Furthermore, when the switch signal $S_{OF}$ of the functional off switch $SW_{OF}$ is in the on state and the vehicular state controller 19 enters both of the driving force control process and the side-slip control process non-operative (into non-operation states) in response to the active switch signal $S_{OF}$, the start of the preceding vehicle follow-up run control is inhibited in the vehicular run controller 20.

It is noted that, in the seventh embodiment, the main switch SWM includes: a change-over switch 21A of a momentary type whose one end is connected to the vehicular battery B via the ignition switch SWIG and operable according to the vehicular driver's intention; and a relay circuit 22 of the self hold state.

The change-over switch 21A is so structured that, when it is placed at an off position, an interruption state occurs between a first input terminal ti1 at which the switch signal SIG is inputted and an output terminal t0. When it is placed at a neutral position (N), a correction state occurs between a second input terminal ti2 at which a power supply via the relay circuit 22 is inputted and an output terminal to. When it is placed at the ON position, the connection state occurs between the first and second input terminals ti1 and ti2 and the output terminal to.

The relay circuit 22 includes a normally open contact S1 and a relay coil RL driving the normally open contact S1. One end of the normally open contact S1 is connected to the ignition switch SWIG and the other end thereof is directly connected to the preceding vehicle follow-up run controller 20 via the set switch SWS and connected to the second input terminal ti2 of the change-over switch 21A.

One end of the relay coil RL is connected to the output terminal to of the change-over switch 21A and the other end thereof is grounded.

Next, the operation of the automatic vehicular velocity controlling apparatus in the seventh embodiment shown in FIG. 11 will be described with reference to the preceding vehicle follow-up run control managing procedure shown in FIG. 12 and the preceding vehicle follow-up run control procedure shown in FIG. 13.

First, the preceding vehicle follow-up run control managing procedure shown in FIG. 12 is executed as the predetermined main program.

At a step SS1, the CPU of the controller 20 determines if the status of the switch signal SIG of the ignition switch SWIG is changed from the off state to the on state or the switch signal SM of the main switch SWM is changed from the on state to the off state.

If the result of determination indicates that either the switch signal SIG is changed from the off state to the on state or the switch signal SM is changed from the on state to the off state (Yes), the routine of FIG. 12 goes to a step SS2. At the step SS2, the CPU of the controller 20 resets the operation history flag FT to "0" to represent that neither the driving force suppression control nor the side-slip suppression control is executed and resets the preceding vehicle follow-up run control inhibit flag FF to "0" to enable the preceding vehicle follow-up run control. Then, the routine is returned to the step SS1.

If the result of determination at the step SS1 indicates that neither the switch signal SIG is changed from the off state to the on state nor the switch signal SM is changed from the on state to the off state (No), the routine goes to the step SS3.

At the step SS3, the CPU of the preceding vehicle follow-up run controller 20 determines if there is the request to perform the follow-up run control.

This determination at the step SS3 is based on whether both of the main switch SWM and the set switch SWS are turned on and the switch signal $S_{SET}$ is in the on state. If the switch signal $S_{SET}$ is in the off state (No) at the step SS3, the main program based on FIG. 12 (viz., the CPU of the vehicular run controller 20) determines that there is no request to perform the preceding vehicle follow-up run control or the preceding vehicle follow-up run control should be suspended. Then, the routine goes to the step SS4 in which the preceding vehicle follow-up run control inhibit flag FF is set to "1" and the routine is returned to the step SS1.

In the result of determination at the step SS3 indicates that the switch signal $S_{SET}$ is in the on state (Yes), the CPU of the vehicular run controller 20 determines that there is the request to continue the preceding vehicle follow-up run control or there is the request to start the same control. Then, the routine goes to a step SS5.

At the step SS5, the CPU of the vehicular run controller 20 determines whether both of the driving force control process and the side-slip control process are in the non-operation state.

This determination (decision step) is based on whether the switch signal $S_{OF}$ of the functional off switch $SW_{OF}$ connected to the vehicular run controller 19 is in the on state. If the switch signal $S_{OF}$ is in the on state, the CPU of the controller 20 determines that both of the driving force control processor and side-slip control are in the non-operation states so that the determination of whether the vehicle is running on the low frictional coefficient road surface cannot be made. Then, the routine goes to the step SS4.

If the switch signal $S_{OF}$ is in the off state (No) at the step SS5, the CPU of the controller 20 decides that both of the driving force suppression control and the side-slip suppression control are in the operation states and it is possible to determine if the vehicle is running on the low frictional coefficient road surface. Thus, the routine goes to the step SS6.

At the step SS6, the CPU of the controller 20 reads the logical value of the execution state signal SS from the vehicular state controller 19 to determine whether SS="1".

If SS="1" (Yes) at the step SS6, the CPU of the controller 20 determines that the vehicle is running on the low frictional coefficient road surface and at least one of the driving force suppression control or the side-slip suppression control has been executed. Then, the routine goes to a step SS7.

At the step SS7, the CPU of the controller 20 sets the operation history flag FT to "1" representing that the vehicle is running on the low frictional coefficient road surface with the driving force suppression control or the side-slip suppression control is executed. Then, the routine goes to the step SS4.

On the other hand, if the result of determination at the step SS6 indicates the logical value of "0" of the execution state signal SS, the CPU of the controller 20 determines that the vehicle is running on the high frictional coefficient road surface and the routine goes to a step SS8.

At the step SS8, the CPU of the controller 20 determines if the operation history flag FT is set to "1", the routine is directly returned to the step SS9. If (FT)="0" (No) at the step SS8, the routine goes to the step SS9 in which the preceding vehicle follow-up run control inhibit flag FF is reset to "0" ((FF)="0").

Then, the routine is returned to the step SS1.

Since the preceding vehicle follow-up run control procedure as described in the first embodiment with reference to FIG. 3 is applicable to FIG. 13 in the seventh embodiment, the detailed description thereof will be omitted and the difference points will be described below.

The difference points are that at the step SS20, the CPU of the vehicular run controller 20 determines whether the preceding vehicle follow-up run control inhibit flag FF is set to "1". If Yes at the step SS20, the timer processing routine of FIG. 13 is ended and the program is returned to the main program of FIG. 12. If FF="0" (No) at the step SS20, the routine goes to the step SS21. The step SS21 corresponds to the step SS22 in FIG. 3. It is noted that, as compared with FIG. 3, the steps SS30 and SS31 are omitted in FIG. 13.

Figure 14:
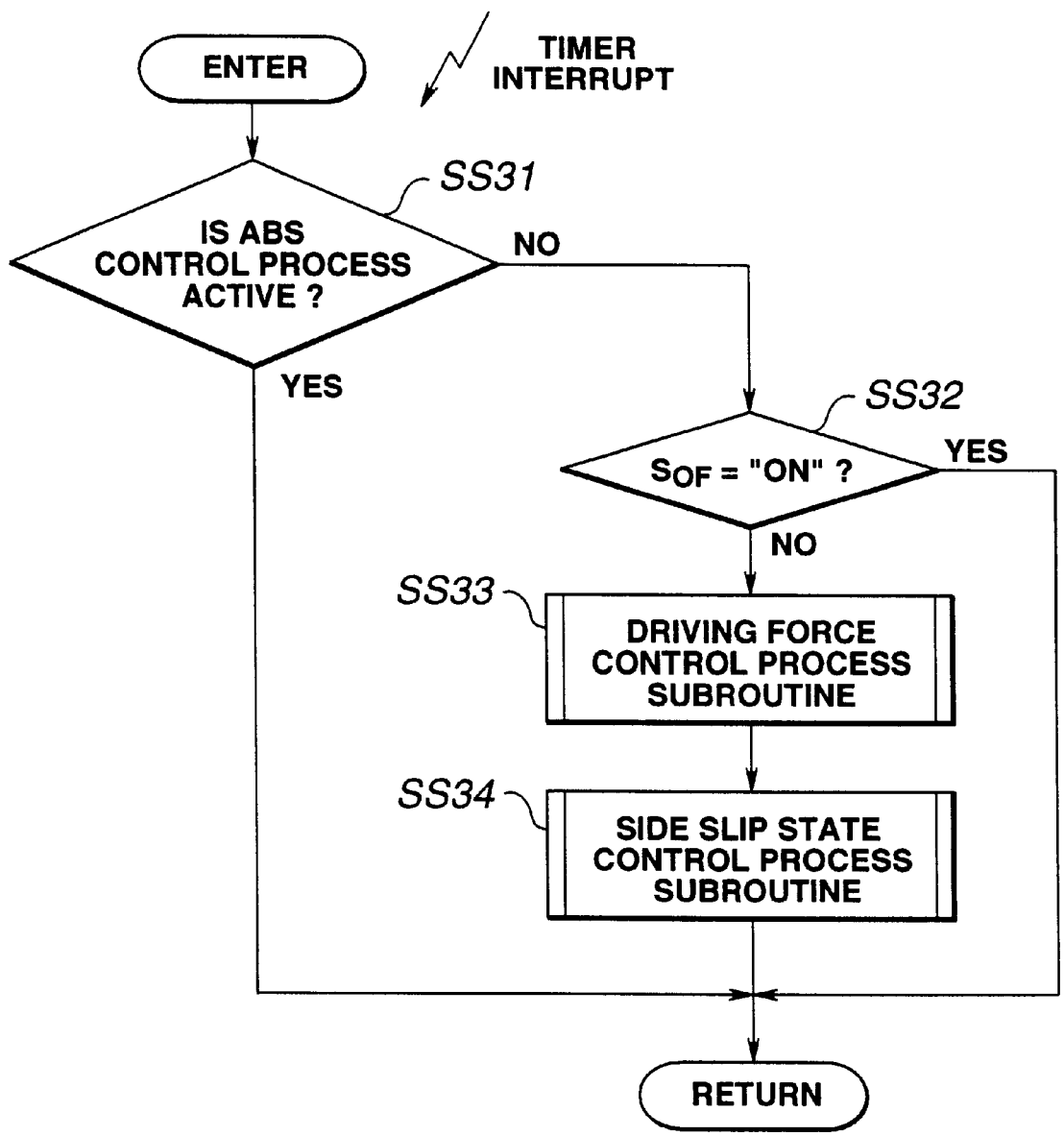
FIG. 14 is an operational flowchart representing an example of a road surface situation dependent vehicular state control procedure executed in the vehicular state controller in the seventh embodiment shown in FIG. 11.

FIG. 14 shows a road surface situation dependent vehicular run (state) control processing routine executed in the vehicular state controller 19.

The road surface situation dependent run control processing routine is executed as a timer interrupt routine for each predetermined time with respect to the anti-lock control processing to be executed as the main program.

First, at a step SS31, the CPU of the vehicular state controller 19 determines if the anti-lock brake control processing is being executed. This determination is based on whether, in the anti-lock brake control procedure, an anti-lock brake control activation flag is set to "1" or reset to "0".

That is to say, this anti-lock brake control activation flag is set to "1" when a wheel cylinder pressure is decreased during the anti-lock brake operation start and is reset to "0" when a predetermined release condition is satisfied. The predetermined release condition includes: a case when the vehicular velocity gives a value in proximity to a stop state of the vehicle; a case when the number of times a moderate pressure increment is performed becomes equal to or greater than a predetermined number of times.

If this flag is set to "1" (Yes) at the step SS31, the timer interrupt routine of FIG. 14 is ended to return to the main routine of the anti-lock brake control.

If this flag is set to "0" (No) at the step SS31, the CPU of the controller 19 determines that the present time is not in the anti-lock brake control and the routine is transferred to a step SS32.

At the step SS32, the CPU of the vehicular state controller 19 determines whether the switch signal $S_{OF}$ is in the on state with the functional off switch $SW_{OF}$ connected to the vehicular state controller 19 turned on.

If $SW_{OF}$ is in the on state (Yes) at the step SS32, the CPU of the vehicular state controller 19 determines that there is the non-operation request to halt the execution of both of the driving force control processing and the side-slip control process and the interrupt routine is returned to the main program of the anti-lock brake control.

If $S_{OF}$=off (No) at the step SS33, the CPU of the controller 19 performs the driving force control process at the step SS34 and the routine goes to the step SS34. At the step SS34, the CPU of the controller 19 performs the side-slip control. Then, the routine of FIG. 14 is ended to return to the main program of the anti-lock brake control.

It is noted that when the driving force suppression control such as to suppress the slip of the driven wheels and the side-slip suppression control are started, the execution state signal SS is changed from the logical value of "0" to that of "1".

The content of the step SS5 shown in FIG. 12 corresponds to non-operation state determining means, the contents of the steps SS4, and SS6 through SS8 and SS20 correspond to preceding vehicle follow-up run control inhibiting means. The contents of the steps SS33 and SS34 in FIG. 14 correspond to road surface situation dependent vehicular run controlling means.

Suppose now that, in the vehicle, a key switch (not shown), the ignition switch SWIG are turned off and both of the main switch SWM and the set switch SWS are turned off, and the vehicle stops in this state. In this state, no power is supplied to each controller 19 and 20. The anti-lock brake control processing, the driving force control processing, and the side-slip state control processing in the vehicular state controller 19 are not operated. In addition, the preceding vehicle follow-up run control managing procedure and the preceding vehicle follow-up run control processing are in the non-operation state are not operated.

In this vehicular stopped state, the key switch is turned on, and, thereafter, the ignition switch SWIG is turned on to start the engine 2. At this time, each controller 19 and 20 receives the power supply. In response to the receipt of the power supply, a predetermined series of executions is started.

At this time, since the vehicle still stops, the anti-lock brake control, the driving force control, and the side-slip control are not executed by the vehicular state controller 19.

The vehicular run controller 20, in turn, executes the preceding vehicle follow-up run control managing procedure shown in FIG. 12. Since the ignition switch SWIG is changed from the off state to the on state, the routine of FIG. 12 goes from the step SS1 to the step SS2 in which the operation history flag FT is reset to "0" and the preceding vehicle follow-up run control inhibit flag FF is set to "0" so that both of (FT) and (FF) are initialized. Then, the routine of FIG. 13 is returned to the step SS1.

Since, at the step SS1, the ignition switch SWIG is turned in the on state, the routine goes to the step SS3.

Suppose that the change-over switch 21A of the main switch SWM is not operated and is placed at the neutral position (N). Non-conduction state occurs between the input terminal ti1 connected to the ignition switch SWIG and the output terminal to connected to the relay coil RL. Hence, the normally open contact s1 maintains at the open state. Thus, the switch signal $S_{SET}$ is maintained at the off state irrespective of the state of the set switch SWS. Therefore, since there is no request by the vehicular driver to perform the preceding vehicle follow-up run control, the routine goes to the step SS4 in which the preceding vehicle follow-up run control inhibit flag FF is set to "1".

Therefore, when a predetermined time has passed and the preceding vehicle follow-up run control procedure shown in FIG. 13 is started, the timer interrupt processing is ended directly from the step SS20 so as to return to the preceding vehicle follow-up run control managing procedure at the step SS2. The state in which the preceding vehicle follow-up run control is inhibited is maintained.

When the vehicle is started from the stopped state to run and, in such a first stage of the vehicular run state, the preceding vehicle follow-up run control is carried out, the change-over switch 21A in the main switch SWM is turned in the on position, and the first input terminal ti1 and the output terminal to are in the conduction state so that the relay coil RL is conducted and the normally open contact s1 is turned off. When the switch signal SM is turned on, the self-hold circuit is formed by the relay coil RL, the second input terminal ti2 from the output side of the normally open contact s1, the second input terminal ti2, and the output terminal to.

In this state, if the operation of the change-over switch 21A is released, the change-over switch 21A is returned to the neutral position. However, in the neutral position, the conduction state between the second input terminal ti2 and the output terminal to is maintained so that the self-hold condition of the relay circuit 22 is maintained.

As described above, the main switch SWM is turned on and, thereafter, the set switch SWS is turned on. Consequently, the switch signal SS is turned on. This information is inputted to the vehicular run controller 20. In the processing shown in FIG. 12 executed by the vehicular run controller 20, the routine is transferred from the step SS3 to the step SS5.

At this time, when the vehicular state controller 19 is executing the driving force control or the side-slip control with the functional off switch $SW_{OF}$ turned off and the switch signal turned off, the routine is transferred to the step SS6.

However, when the vehicular state controller 19 neither executes the driving force suppression control nor the side-slip suppression control and the execution state signal SS has the logical value of "0", the CPU of the vehicular run controller 20 determines that the vehicle is running on the high frictional coefficient road surface such as a dry paved road and the routine of FIG. 12 goes to the step SS8.

In the initial state, the operation history flag FT is reset to "0". Hence, after the preceding vehicle follow-up run control inhibit flag FF is set to "0" at the step SS9, the routine is returned to the step SS1.

Therefore, at a timing when the timer interrupt processing shown in FIG. 13 is executed for each predetermined time, the routine goes from the step SS20 to the step SS21. The preceding vehicle follow-up run control based on the inter-vehicle distance D and the estimated vehicular body velocity Vc is started.

At the initial stage of the preceding vehicle follow-up run control, the set vehicular velocity is maintained to perform the auto-cruise speed control for the vehicle when no preceding vehicle running ahead of the vehicle is present. If the preceding vehicle is present, the CPU of the vehicular run controller 20 calculates the target value G* of the vehicular acceleration/deceleration on the basis of the inter-vehicle distance D and the target value D* of the inter-vehicle distance and executes either the engine output control or the braking control according to the target value G* of the vehicular acceleration/deceleration (variation rate of the vehicular velocity). The preceding vehicle follow-up run control is carried out to maintain the target value D* of the inter-vehicle distance according to the estimated vehicular body velocity Vc.

When, during the preceding vehicle follow-up run control on the high frictional coefficient road surface, the vehicle enters, in turn, to run on the low frictional coefficient road surface and either the driving force suppression control due to the occurrence of the slips on the driven wheels is executed or the side-slip suppression control due to the occurrence of the slips on the vehicular body in the vehicular side (lateral) direction during the turning of the vehicle, the execution state signal SS indicates the logical value of "1". Hence, the routine goes to the step SS7 from the step SS6 in which the operation history flag FT is set to "1" and the preceding vehicle follow-up run control inhibit flag FF is set to "1".

Hence, when the preceding vehicle follow-up run control of FIG. 13 is executed, the timer interrupt processing of FIG. 13 is started from the step SS20, the timer interrupt processing of FIG. 13 is returned to the processing shown in FIG. 12. Hence, the preceding vehicle follow-up run control is immediately inhibited.

Consequently, the automatic vehicular velocity controlling apparatus according to the present invention can assure a positive prevention of the driven wheel slips susceptible to occur since the acceleration during the vehicular run on the low frictional coefficient road surface becomes lower than that during the vehicular run on the high frictional coefficient road surface so that the detected value of the inter-vehicle distance becomes longer than the target value of the inter-vehicle distance, thus the target value of the vehicular acceleration/deceleration being enlarged.

On the other hand, since, in the preceding vehicle follow-up run control managing procedure shown in FIG. 12, the operation history flag FT is maintained at "1", the switch signal $S_{SET}$ of the set switch is in the on state, the switch signal $S_{OF}$ of the functional off switch $SW_{OF}$ is turned off, the driving force control processing and the side-slip control processing are in the operation states, and neither the driving force suppression control nor the side-slip suppression control is executed, the routine goes from the step SS1 to the step SS8 via the steps SS3, SS5, and SS6. Hence, since the preceding vehicle follow-up run control inhibit flag FF is set to "1", the preceding vehicle follow-up run control shown in FIG. 13 is inhibited.

When the vehicular driver turns the main switch SWM is in the off position when the road surface situation is changed from the vehicular run on the low frictional coefficient road surface to the vehicular run on the high frictional coefficient road surface, the switch signal SM is changed from the on state to the off state. When the routine is transferred from the step SS1 to the step SS2, the preceding vehicle follow-up run control inhibit flag FF is reset to "0". In addition, the operation history flag FT is reset to "0".

Under this state, if the main switch SWM is again turned in the on position, the preceding vehicle follow-up run control processing can be started.

However, when the preceding vehicle follow-up run control is started, the functional off switch $SW_{OF}$ is turned on. When the switch signal $S_{OF}$ is turned on, the driving force control processing and the side-slip control processing are in the non-operation states. Since the execution state signal SS is maintained at the logical value of "0" and it becomes impossible to perform the determination of the road surface situation in the preceding vehicle follow-up run control managing procedure in FIG. 12, the routine shown in FIG. 12 goes to the step SS4 upon the determination at the step SS5 that the functional off switch $SW_{OF}$ is turned on. At this time, the preceding vehicle follow-up run control inhibit flag FF is set to "1" and the preceding vehicle follow-up run control processing shown in FIG. 13 is inhibited (disabled).

Hence, the accurate inhibit for the start of the preceding vehicle follow-up run control under the impossible condition of the road surface situation can be made. The preceding vehicle follow-up run control is permitted (enabled) only when the accurate determination of the road surface situation can be made. Thus, a safe driving of the vehicle in which the automatic vehicular velocity controlling apparatus in the sixth embodiment is installed can be assured.

Furthermore, when the ignition switch SWIG is turned off with the vehicle stopped under the continued preceding vehicle follow-up run control, the power supplied to the normally open contact s1 of the relay circuit 22 of the main switch SWM from the battery B is interrupted so that the power supply to the relay coil RL is interrupted. Hence, the self-hold function is released so that the main switch SWM is turned off.

This off state causes the ignition switch SWIG to be turned in the off state again and, thereafter, this off state on the main switch SWM is continued until the change-over switch 21A is operated in the on position.

(Eighth Embodiment)

Figure 15:
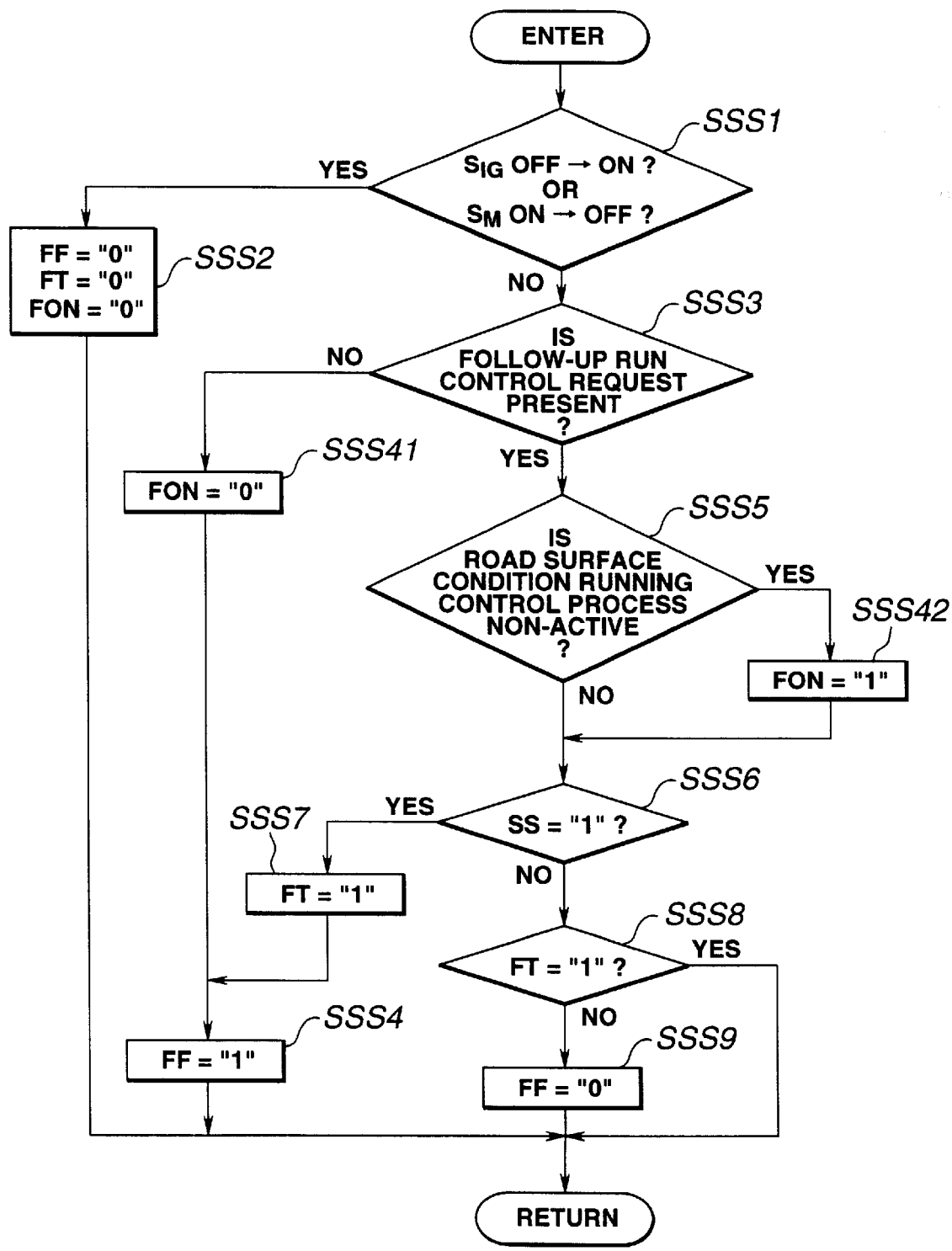
FIG. 15 is an operational flowchart for explaining an example of the preceding vehicle follow-up run control managing procedure in an eighth preferred embodiment of the automatic vehicular velocity controlling apparatus according to the present invention.
Figure 16:
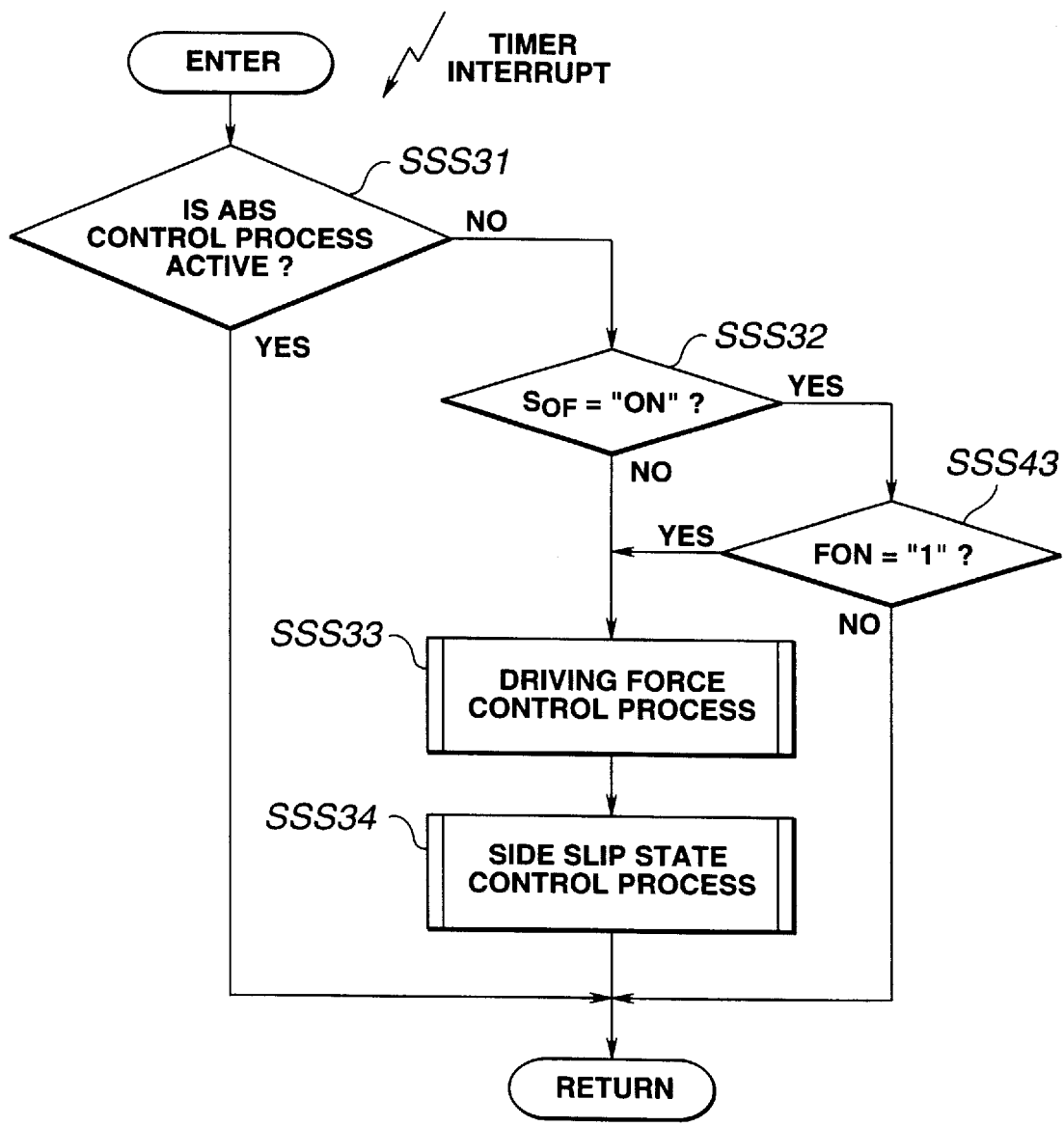
FIG. 16 is an operational flowchart representing an example of the road surface situation dependent vehicular state control procedure in the eighth preferred embodiment.

FIGS. 15 and 16 show the preceding vehicle follow-up run control managing procedure and the preceding vehicle follow-up run control procedure executed in an eighth preferred embodiment of the automatic vehicular velocity controlling apparatus according to the present invention.

In the eighth embodiment, the functional off switch $SW_{OF}$ with respect to the vehicular state controller 19 is turned on and the vehicular state controller 19 indicates the non-operation states on the driving force control processing and the side-slip control processing. In this case, the functional off switch $SW_{OF}$ is invalidated (disabled) when the preceding vehicle follow-up run control is to be started so that both of the driving force control processing and the side-slip control processing is forcefully started to run.

In the eighth embodiment, to the preceding vehicle follow-up run control processing executed by the preceding vehicle follow-up run controller 20, as shown in FIG. 15, a process such that the forceful execution flag FON representing the forceful start of both the driving force control and the side-slip control at the step SS2 is reset to "0" to release the forceful start of execution in both the driving force control and the side-slip control is added into the step SS2 in FIG. 12 as a step SSS2.

In addition, if there is no request by the vehicular driver to perform the preceding vehicle follow-up run control according to the result of determination at a step SSS3 (corresponding to the step SS3 in FIG. 12), the routine of FIG. 15 goes to a step SSS41 in which the forceful execution flag FON is forcefully released (reset) to "0" and goes to the step SSS4 (corresponding to the step SS4). At the step SSS4, FF="1".

If the road surface situation dependent vehicular run (state) control processing indicates the non-operation state at the step SSS5 (corresponding to the step SS5) (Yes), the routine of FIG. 15 goes to the step SSS42 in which the forceful execution flag FON is set to "1".

The other steps those shown in FIG. 15 are the same as those described in the seventh embodiment with reference to FIG. 12. The triple S in FIG. 15 correspond to double S. The detailed description thereof will herein be omitted.

In addition, the road surface situation dependent vehicular state control processing in the road surface situation dependent vehicular state controller (vehicular state controller) 19 will be described with reference to FIG. 16.

As shown in FIG. 16, when the result of determination at the step SSS2 (corresponding to the step SS32) in FIG. 14 in the seventh embodiment indicates that the switch signal $S_{OF}$ of the functional off switch $SW_{OF}$ is in the on state, the routine goes to a step SSS43. If the result of determination at the step SSS43 indicates that the forceful execution flag FON is set to "1", the routine goes to the step SSS33 without function off. If the forceful execution flag FON is reset to "0", the same processing as described in FIG. 14 is carried out, viz., the timer interrupt routine of FIG. 16 is ended. The step SSS31 corresponds to the step SS31. The steps SSS33 correspond to the step SS33. The step SSS34 correspond to the step SS34.

The step SS42 in FIG. 15 and the step SSS43 in FIG. 16 correspond to the forceful operation recovery setting means.

Figure 17:
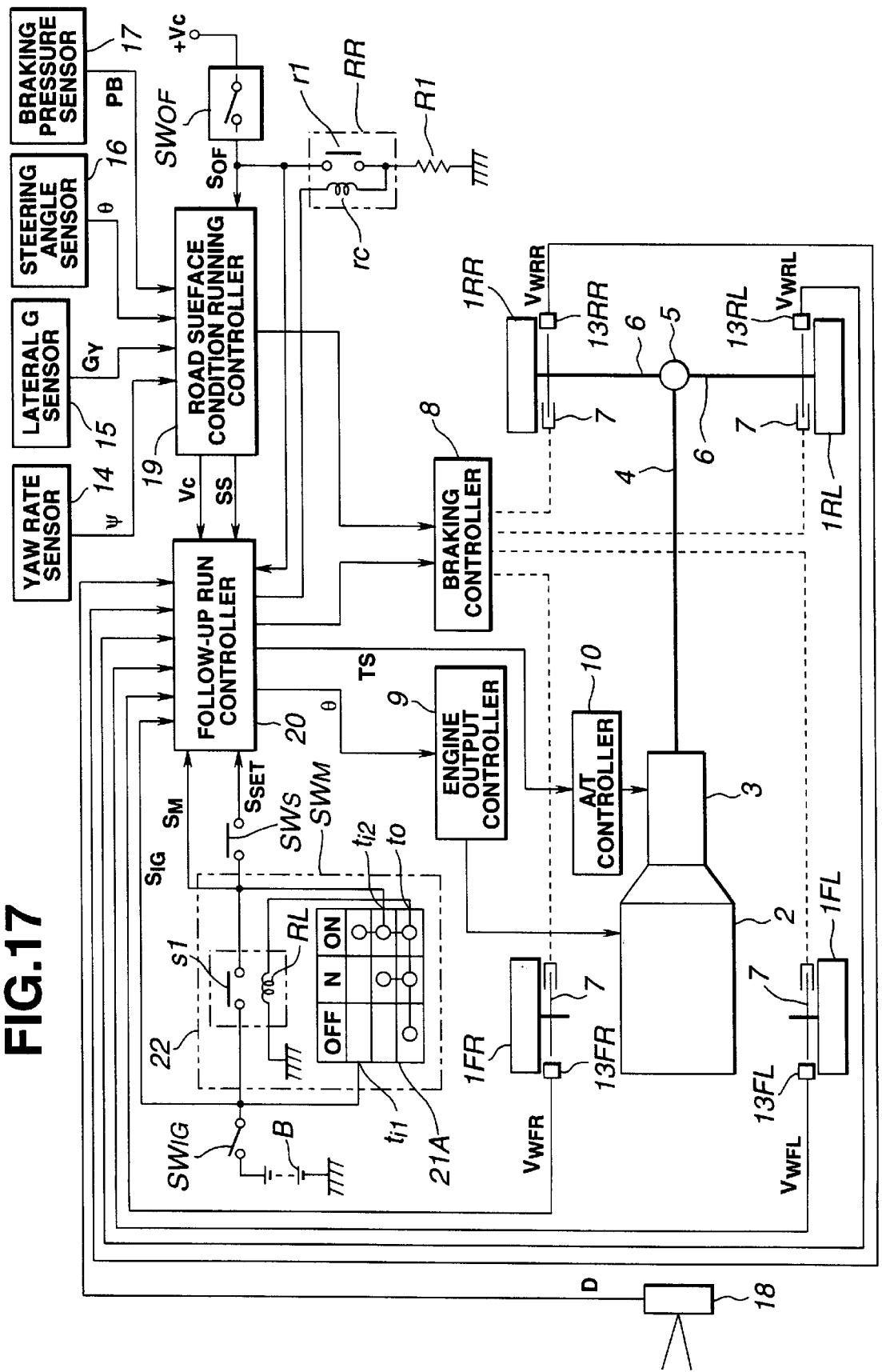
FIG. 17 is a schematic configuration of the automatic vehicular velocity controlling apparatus in a modification of the eighth preferred embodiment shown in FIGS. 15 and 16.

As described in the eighth embodiment, the forceful execution flag FON is set to "1", the driving force control processing and side-slip control processing are forcefully operated. However, as shown in FIG. 17 (FIG. 17 shows a modification of the eighth embodiment. The hardware structure of the eighth embodiment is the same as shown in FIG. 11 of the seventh embodiment).

As shown in FIG. 17, a relay circuit RR is interposed between the functional off switch SWOF, the vehicular state controller 19, and the ground.

The relay circuit RR includes: a normally open relay contact r1 connected to the functional off switch $SW_{OF}$; a resistor R1 connected between the relay contact r1 and the ground; and a relay coil rc connected between the vehicular state controller 19 and the relay contact r1.

The relay coil rc receives a control signal SC outputted from the vehicular run controller 20. In place of the step SSS42 in FIG. 15 at which the forceful execution flag FON is set to "1", the control signal SC having the predetermined value of current may be outputted to the relay coil rc so that the switch signal $S_{OF}$ of the functional switch $SW_{OF}$ may forcefully be varied to the off state.

(Ninth Embodiment)

Figure 18:
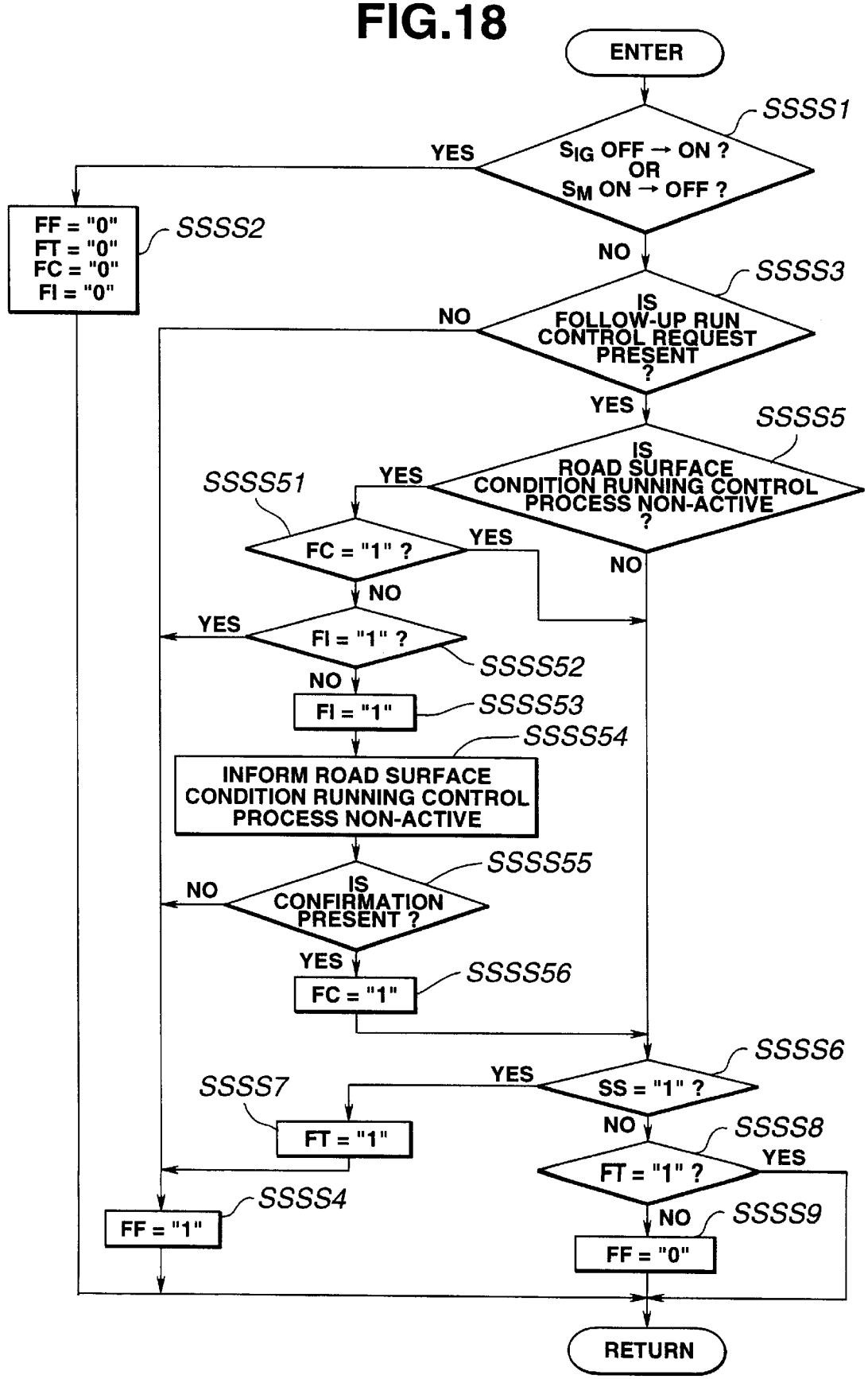
FIG. 18 is an operational flowchart representing an example of the preceding vehicle follow-up run managing control procedure in a ninth preferred embodiment according to the present invention.

FIG. 18 shows the preceding vehicle follow-up run control managing procedure executed in a ninth preferred embodiment of the automatic vehicular velocity controlling apparatus according to the present invention.

In the ninth embodiment, when there is the request by the vehicular driver to start the preceding vehicle follow-up run control, the vehicular driver is informed that the driving force control procedure and the side-slip control procedure are in the non-operation states. Hence, the determination of whether the preceding vehicle follow-up run control should be started or not is based on the vehicular driver's decision.

In the ninth embodiment, the preceding vehicle follow-up run controller 20 is modified as shown in FIG. 18 from that described in the seventh embodiment shown in FIG. 12.

That is to say, in FIG. 18, if the result of determination at the step SSSS5 indicates that the road surface situation dependent vehicular run control processing including the side-slip control processing is in an non-operation state, the routine goes to a step SSSS51. At the step SSSS51, the CPU of the vehicular run controller 20 determines whether a continuation confirmation flag FC, the flag FC representing whether the vehicular driver has selected one of two selections, viz., either one of which the preceding vehicle follow-up run control should be continued or not, is set to "1". If the continuation confirmation flag FC need to be reset to "0" (No) at the step SSSS51, the routine goes to a step SSSS52.

At the step SSSS52, the CPU of the controller 20 determines whether an information execution flag FI is set to "1", the information execution flag FI representing whether the information execution such that the vehicular driver is informed that the road situation dependent vehicular run control processing is in the non-operation state. If the information execution flag FI is set to "1" (yes), the routine goes to the step SSSS4 in which FF="1".

If the information execution flag FI is reset to "0" at a step SSSS52 (No), the routine then goes to a step SSSS53 in which the information execution flag FI is set to "1" (FI="1").

Then, the routine goes to a step SSSS54.

At the step SSSS54, the information processing such that the vehicular driver is informed that the road surface situation dependent vehicular run control processing including the driving force control processing is in the non-operation state. Then, the routine goes to a step SSSS55.

At the step SSSS55, the CPU of the vehicular run controller 20 determines whether the confirmation operation has been carried out by the vehicular driver upon the receipt of the informing process described above.

If the confirmation operation is present (Yes) at the step SSSS55, the routine goes to a step SSSS56 in which FC="1".

At the step SSSS56, the continuation confirmation flag FC is set to "1" and the routine goes to a step SSSS6. If there is no confirmation operation by the vehicular driver (No) at the step SSSS55, the routine goes to the step SSSS4 (FF="1")

The steps SSSS6, SSSS7, SSSS8, and SSSS9 shown in FIG. 18 correspond to the steps SSS6, SSS7, SSS8, and SSS9 shown in FIG. 15.

It is noted that the information processing method such that the road surface situation dependent vehicular state control processing is in the non-operation state at the step SSSS54 in FIG. 18 includes the use of the A/V system having, e.g., the liquid crystal display of a touch panel.

That is to say, such the message that "DRIVING FORCE CONTROL/SIDE-SLIP CONTROL OPERATION HISTORY IS PRESENT: confirm the road surface situation" is displayed on the image screen of the liquid crystal display.

At the step SSSS55 of FIG. 18, the setting confirmation button and canceling confirmation button are displayed on the image screen corresponding to the touch panel. When the setting confirmation button is selected, the routine of FIG. 18 goes to the step SSSS56. If the canceling confirmation button is selected, the routine of FIG. 18 goes to the step SSSS4.

The steps SSSS51 through SSSS56 correspond to control continuation means.

In the ninth embodiment, with all of the preceding vehicle follow-up vehicular run control inhibit flag FF, the operation history flag FT, the continuation confirmation flag FC, and information execution flag FI reset to "0", the main switch SWM and the set switch SWS are turned on. In this state when there is the request by the vehicular driver to start the preceding vehicle follow-up run control, the routine of FIG. 18 goes to the step SSSS5 from the step SSSS3.

At this time, when the functional off switch $SW_{OF}$ for the vehicular state controller 19 is turned off, the preceding vehicle follow-up run control processing shown in FIG. 13 is started in the same manner as described in the seventh embodiment. However, if the functional off switch $SW_{OF}$ is turned on with its switch signal $S_{OF}$ turned on, the routine of FIG. 18 goes to the step SSSS51. Since the continuation confirmation flag FC is reset to "0", at this time, at the step SSSS51, the routine branches to the step SSSS53 in which the information execution flag FI is set to "1".

Then, the routine goes to the step SSSS54 in which the informing process such that the vehicular driver is informed that the road surface situation dependent vehicular state (run) control processing is in the non-operation state is carried out. Then, if, at the next step SSSS55,the vehicular driver is determined to have the intention to start the preceding vehicle follow-up run control at the step SSSS5, the continuation confirmation flag FC is set to "1" at the step SSSS56.

Then, the routine goes to the step SSSS6.

Thereafter, the same processing as those in the seventh embodiment are carried out to start the preceding vehicle follow-up run control shown in FIG. 13.

As described above, when the preceding vehicle follow-up run control is started according to the vehicular driver's own decision with the road surface situation dependent vehicular run control processing in the non-operation state under the state in which the determination on the road surface situation is not enabled to be made.

The continuation confirmation flag FC is set to "1". In the processing of FIG. 18, the routine goes from the step SSSS5 to the step SSSS6 via the step SSSS51 so that the preceding vehicle follow-up run control is continued and the road surface vehicular run control processing is in the non-operation state.

In order to halt the preceding vehicle follow-up run control, the main switch SWM is operated in the off position so that once the routine goes to the step SSSS2 and all of the flags FF, FT, FC, and FI are reset to zero and the routine goes via the step SSSS3 to the step SSSS4 in which the preceding vehicle follow-up run control is inhibited with the preceding vehicle follow-up run control inhibit flag FF being set to "1". Next, if the preceding vehicle follow-up run control managing procedure shown in FIG. 18 is executed, the routine goes from the step SSSS5 to the step SSSS4 via the steps SSSS51 and SSSS52. Since the proceeding vehicle follow-up run control inhibit flag FF is continued to be set to "1", the vehicular driver is not again informed that the road surface situation dependent vehicular run control processing is in the non-operation state.

As described above, in the ninth preferred embodiment, if both of the driving force control processing and the side-slip control processing are in the non-operation states and the determination of the road surface state cannot be made by the preceding vehicle follow-up run controller 20, the vehicular driver can determine himself the road surface situation and can start or halt the preceding vehicle follow-up run control according to his decision. Hence, the preceding vehicle follow-up run control can be performed, the vehicular driver being aware of the vehicular run on the low frictional coefficient road surface. Consequently, an executable allowance range of the preceding vehicle follow-up run control can be widened.

The alternatives of the second preferred embodiment described above can apply equally well to those of the ninth preferred embodiment.

(Tenth Embodiment)

Figure 19:
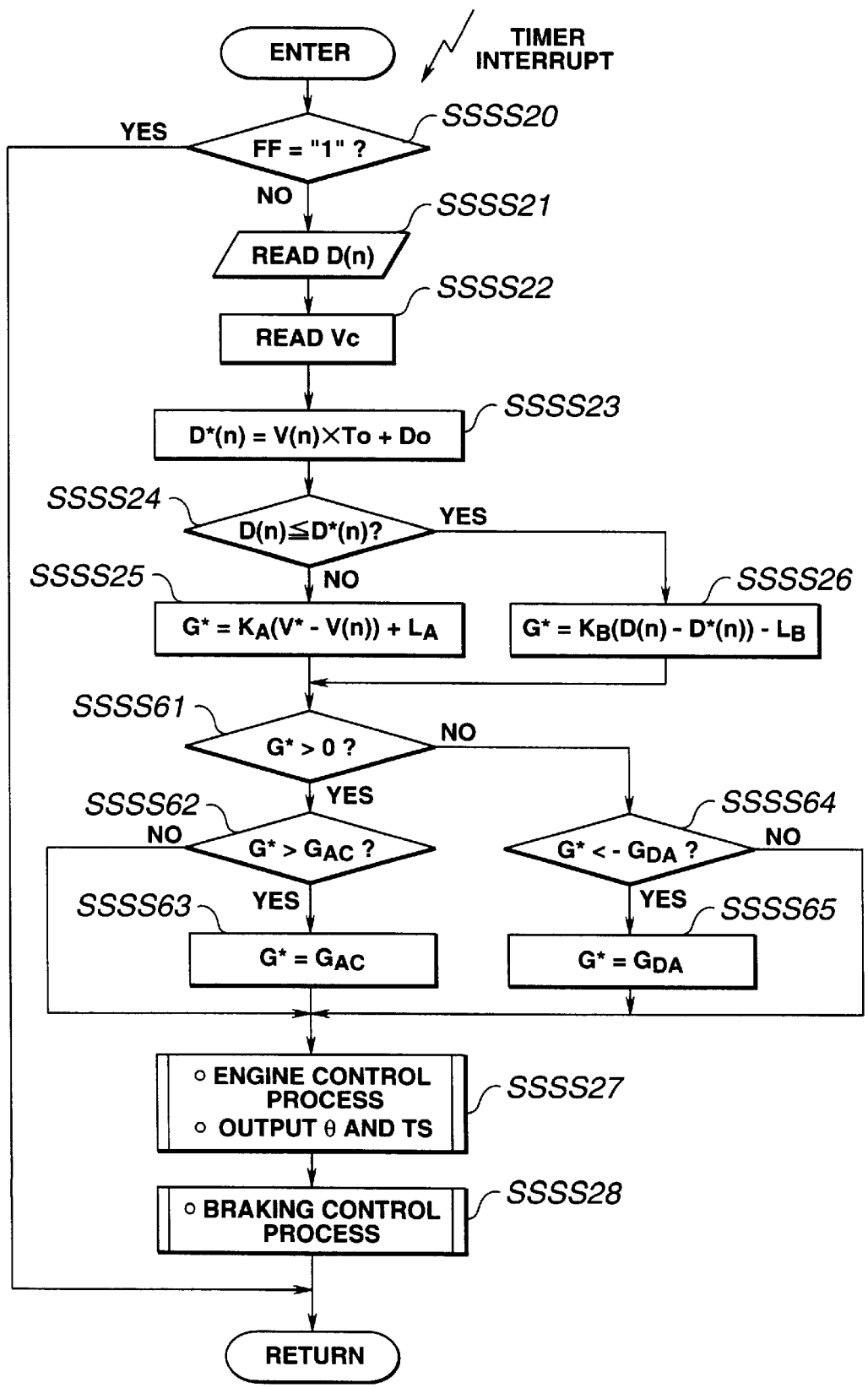
FIG. 19 is an operational flowchart representing an example of the preceding vehicle follow-up run control procedure in a tenth preferred embodiment of the automatic vehicular velocity controlling apparatus according to the present invention.
Figure 20:
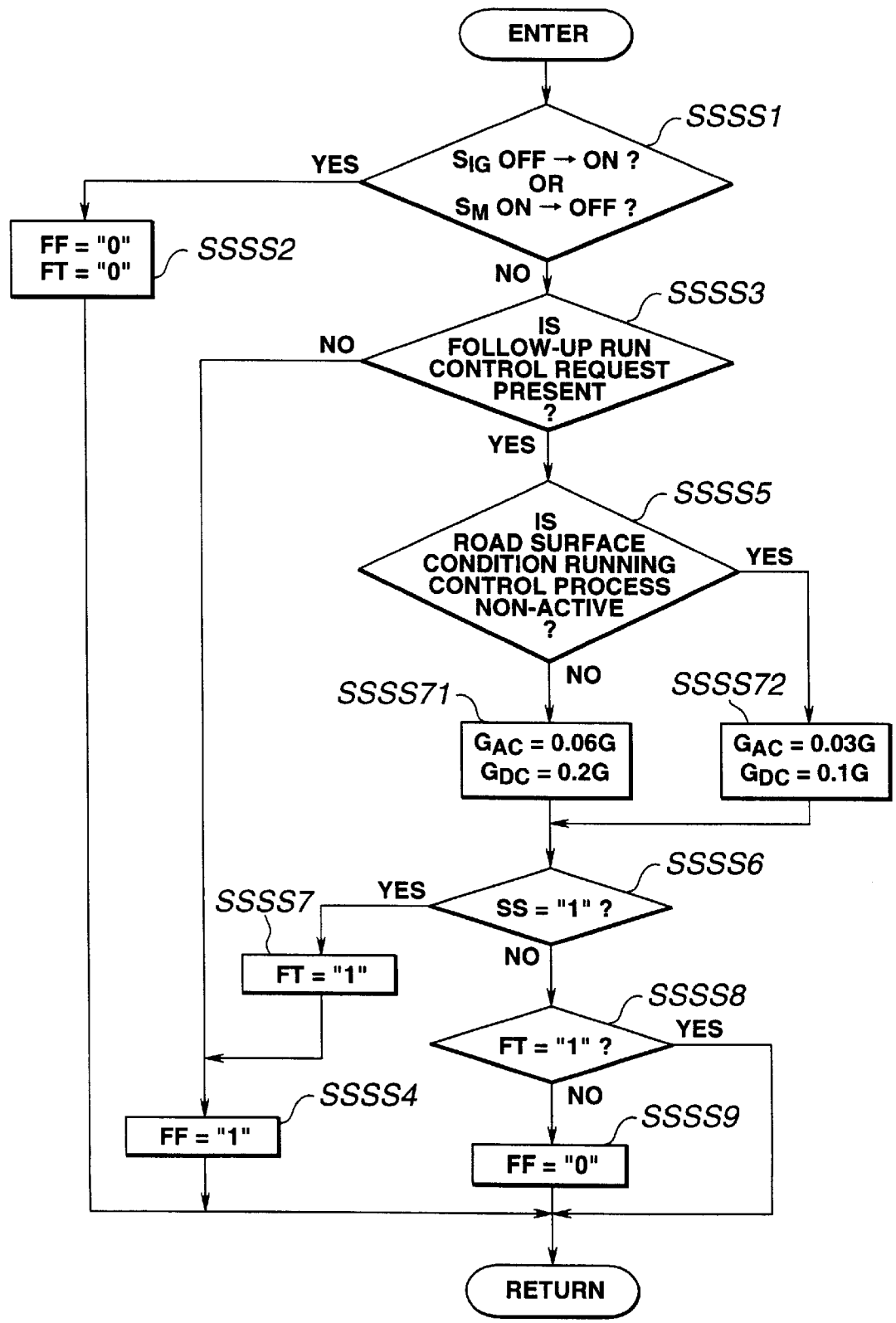
FIG. 20 is an operational flowchart representing an example of the preceding vehicle follow-up run control procedure executed in the tenth embodiment of the automatic vehicular velocity controlling apparatus.

FIGS. 19 and 20 show the preceding vehicle follow-up run control managing procedure and the preceding vehicle follow-up run control procedure executed in a tenth preferred embodiment of the automatic vehicular velocity controlling apparatus according to the present invention.

In the tenth embodiment, when the road surface situation dependent vehicular run control processing including the driving force control and the side-slip control is in the non-operation state, the preceding vehicle follow-up run control is enabled with the vehicular acceleration/deceleration suppressed.

In the tenth embodiment, the preceding vehicle follow-up run control processing (steps SSSS61 through SSSS65) is added which corrects (limits) the target value G* of the vehicular acceleration/deceleration before the step SSSS27 (which corresponds to the step SS27 shown in FIG. 13).

In details, in the acceleration/deceleration limitation processing, at the step SSSS61, the CPU of the vehicular run controller 20 determines whether the target value G* of the vehicular acceleration/deceleration is positive. If G*>0 at the step SSSS61 (Yes), the routine goes to a step SSSS62 since the CPU of the controller 20 determines that the vehicle is accelerated.

Then, the routine goes to the step SSSS62 to compare G* and $G_{AC}$ to determine whether G*>$G_{AC}$, wherein $G_{AC}$ denotes an upper limit value on the vehicular acceleration (target value G*). If G*>$G_{AC}$ (Yes) at the step SSSS62, the routine goes to a step SSSS63 in which G*=$G_{AC}$.

If G*≦$G_{AC}$ (No) at the step SSSS62, the routine jumps to the step SSSS27.

On the other hand, if the result of determination at the step SSSS61 indicates G*≦0, the CPU of the controller 20 determines that the vehicle is cruising (is running at a constant velocity) or the vehicle is decelerated and the routine goes to a step SSSS64 in which the CPU of the controller 20 compares the target value G* with –$G_{DA}$ which is set in the follow-up run control managing procedure shown in FIG. 20 (as will be described later) to determine whether G*<–$G_{DA}$ (–$G_{DA}$ denotes a lower limit value on the vehicular deceleration).

If G*≦–$G_{DA}$ (Yes) at the step SSSS64, the routine shown in FIG. 19 goes to the step SSSS27.

If G*≧–GDA (No) at the step SSSS64, the routine goes directly to the step SSSS27.

FIG. 20 shows the preceding vehicle follow-up run control procedure in the tenth embodiment.

As shown in FIG. 20, the result of determination at the step SSSS5 (corresponds to the step SS5 shown in FIG. 12) indicates that the road surface situation dependent vehicular run control procedure including the driving force control and side-slip control procedures indicates the operation state, the routine of FIG. 20 goes to the step SSSS71 in which an ordinary acceleration set value, for example, 0.06 G is set as (G denotes a gravitational acceleration) the upper limit value $G_{AC}$ of the acceleration.

Together with this, an ordinary deceleration set value, for example, –0.2 G is set as the lower limit value of $G_{DC}$. Then, the routine goes to a step SSSS6. Then, the routine goes to the step SSSS6 (which corresponds to SS6 in FIG. 12).

If the road surface situation dependent vehicular state control processing is in the non-operation state (No) at the step SSSS5, the routine goes to a step SSSS72.

At the step SSSS72, the CPU of the vehicular run controller 20, as the upper limit value $G_{AC}$ of the acceleration, sets a suppression acceleration value, for example, 0.03 G which is smaller than the ordinary acceleration set value and the CPU of the vehicular run controller 20 sets, as the lower limit value –$G_{DA}$ of the vehicular deceleration, a suppression acceleration value, for example, 0.1 G which is larger than the ordinary deceleration set value ($G_{AC}$=0.3 G, $G_{DC}$=0.1 G). Then, the routine goes to the step SSSS6.

The steps SSSS1 through SSSS9 corresponds to the steps SS1 through SS9 shown in FIG. 12.

The steps SSSS61 through SSSS65 in FIG. 19 and the step SSSS72 shown in FIG. 20 corresponds to the control processing means.

In the tenth embodiment, when both of the main switch SWM and the set switch SWS are turned on to start the preceding vehicle follow-up run control, the functional off switch $SW_{OF}$ is turned off which is connected to the vehicular state controller 19 and the driving force control processing and the side-slip control processing are in the operation states. In this state, the routine goes from the step SSSS5 to the step SSSS71 in which both of the upper limit value and the lower limit value of the deceleration $G_{DA}$ are set to the ordinary values of 0.06 G and –0.2 G.

If the detected value of the inter-vehicle distance D(n) is longer than the target value D*(n) of the inter-vehicle distance, the vehicle is accelerated with the acceleration corresponding to 0.06 G at maximum to shorten the inter-vehicle distance D.

On the contrary, if the detected value of the inter-vehicle distance D(n) is shorter than the target value of the inter-vehicle distance D*(n), the vehicle is decelerated with the deceleration corresponding to –0.2 G at maximum to elongate the inter-vehicle distance D(n) can be made coincident with the target value D*(n) of the inter-vehicle distance.

On the other hand, if the functional off switch $SW_{OF}$ is turned on and the driving force control processing and the side-slip control are in the non-operation state, the routine goes from the step SSSS5 to the step SSSS72.

If the upper limit value $G_{AC}$ of the acceleration is changed from the ordinary value of 0.06 G the smaller value of 0.03 G and the lower limit value $G_{DA}$ of the deceleration is changed form the ordinary value of –0.2 G to the larger value of –0.1 G, the acceleration state and deceleration state are suppressed (reduced) as compared with the ordinary set values.

In a case where the vehicle is running on the low frictional coefficient road surface under the preceding vehicle follow-up run control state, a road wheel spin during the vehicular acceleration and the road wheel locks can be reduced (suppressed) and it becomes possible to make the stable control for the following-up to the preceding vehicle.

In the tenth embodiment, the upper limit value of the vehicular acceleration $G_{AC}$ is changed from the ordinary value 0.06 G to the suppressed value 0.03 G and the lower limit value of the vehicular deceleration is changed from the ordinary value of –0.2 G to the suppressed value of –0.1 G.

These values may arbitrarily be modified according to the vehicular specification. The acceleration performance and deceleration performance may be reduced in the case when the driving force control processing and the side-slip control processing are in the non-operation state as compared with the case of the operation state of these controls.

(Eleventh Embodiment)

Figure 21:
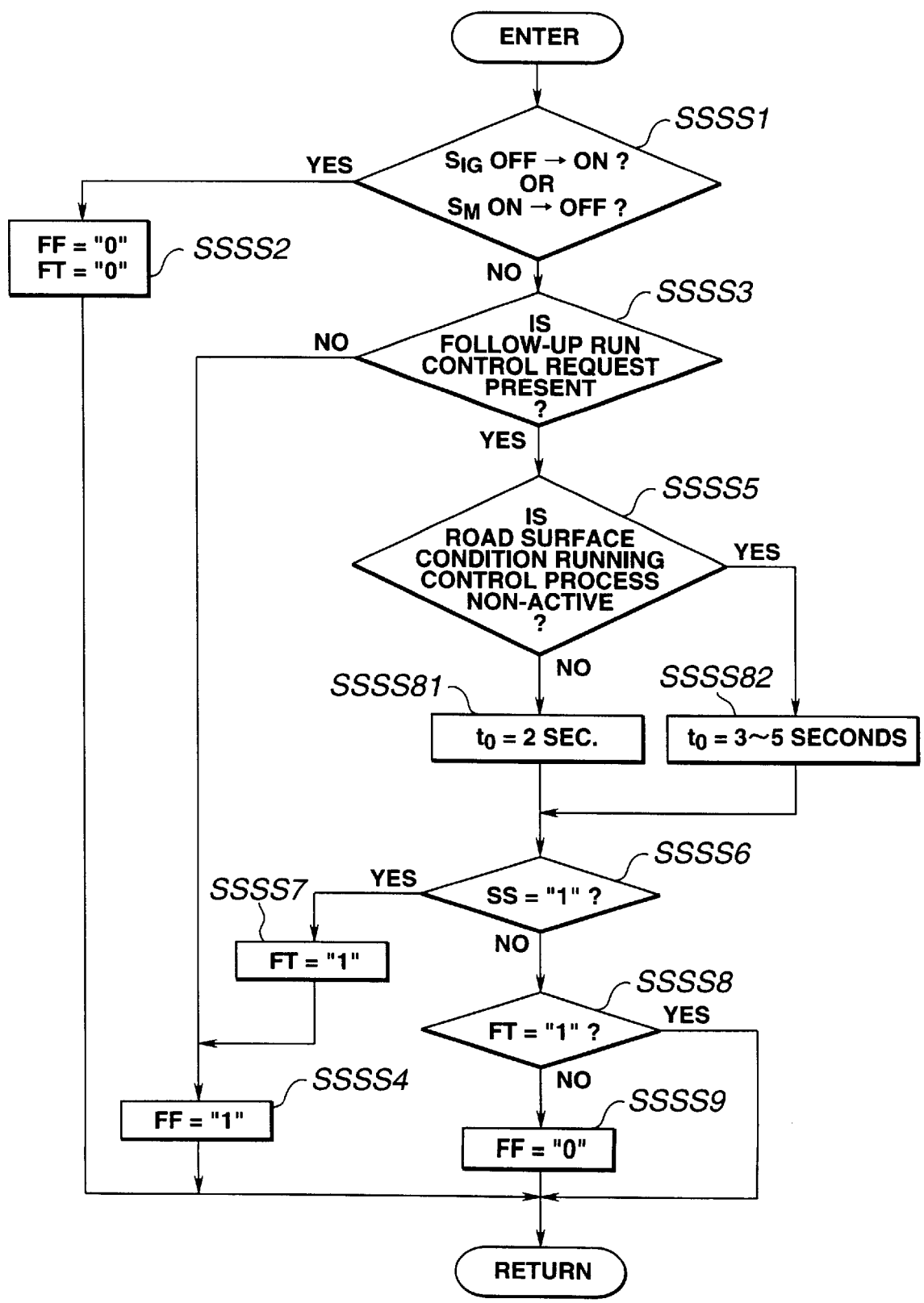
FIG. 21 is an operational flowchart representing an example of the preceding vehicle follow-up run control managing procedure of an eleventh preferred embodiment of the automatic vehicular velocity controlling apparatus according to the present invention.

FIG. 21 shows the preceding vehicle follow-up run control managing procedure executed in an eleventh preferred embodiment of the automatic vehicular velocity controlling apparatus according to the present invention.

In the eleventh embodiment, the target value D(n)* of the inter-vehicle distance is modified to a value larger than its ordinary value when the road surface situation dependent vehicular state control processing is in the non-operation state at the start of the preceding vehicle follow-up run control.

In the eleventh embodiment, in the preceding vehicle follow-up run control procedure shown in FIG. 21 and executed in the preceding vehicle follow-up run controller 20, the step SSSS71 shown in FIG. 20 is replaced with a step SSSS81. At the step SSSS81 shown in FIG. 21, the inter-vehicle time duration t0 during which the vehicle has reached to the position Lo (meters) behind the preceding vehicle and required to calculate the target value of the inter-vehicle distance D*(n) is set to an arbitrary value of two seconds. In addition, the step SSSS72 shown in FIG. 20 is replaced with a step SSSS82. At the step SSSS82, the inter-vehicle time duration t0 is set to a suppression value approximately three through five seconds which is larger than the ordinary value of 2 seconds. The other steps shown in FIG. 21 are the same as those shown in FIG. 20.

The detailed explanations thereof will be omitted herein.

The steps SSSS82 in FIG. 21 corresponds to the control suppression means.

In the eleventh embodiment, when the preceding vehicle follow-up run control is started with the main switch SWM and set switch SWS turned on, the functional off switch $SW_{OF}$ connected to the vehicular state controller 19 is turned off and the driving force control process and the side-slip control process are in the operation states, the routine of FIG. 21 goes to the step SSSS5 to the step SSSS81 in which the inter-vehicle time duration t0 is set to the ordinary value of 2 seconds. Hence, the target value of the inter-vehicle distance D*(n) calculated at the step SS23 shown in FIG. 13 is set to a value corresponding to the inter-vehicle distance required when the vehicle runs on the high frictional coefficient road surface. The target value G* of the acceleration/deceleration on the basis of the value described above is calculated to perform the optimum preceding vehicle follow-up run control.

On the other hand, when the frictional off switch $SW_{OF}$ is turned on and the driving force control processing and the side-slip control processing are in the non-operation states, the routine of FIG. 21 goes from the step SSSS35 to the step SSSS82 in which the inter-vehicle time duration t0 is set to the suppression value of 3 through 5 seconds longer than the ordinary value of 2 seconds. Hence, when the preceding vehicle follow-up run control shown in FIG. 13 is executed in this embodiment, the target value D*(n) of the inter-vehicle distance calculated at the step SS23 becomes long as compared with the case wherein the driving force control processing and side-slip control are in the operation states, it becomes possible to perform the preceding vehicle follow-up run control with the sufficient inter-vehicle distance maintained even if the vehicle is running on the low frictional coefficient road surface under the preceding vehicle follow-up run control state.

In the eleventh embodiment, the inter-vehicle time duration t0 is changed from the ordinary value of 2 seconds to 3 through 5 seconds.

However, these numerical values may arbitrarily be modified according to a vehicular specification.

In summary, the target value of the inter-vehicle distance may be set to be longer when the driving force control processing and side slip control processing are in the non-operation state as compared with the case under the operation state.

In addition, in the eleventh embodiment, the inter-vehicle time duration t0 is modified. However, a maximum value of the target value D*(n) of the inter-vehicle distance may be fixed.

(Twelfth Embodiment)

Figure 22:
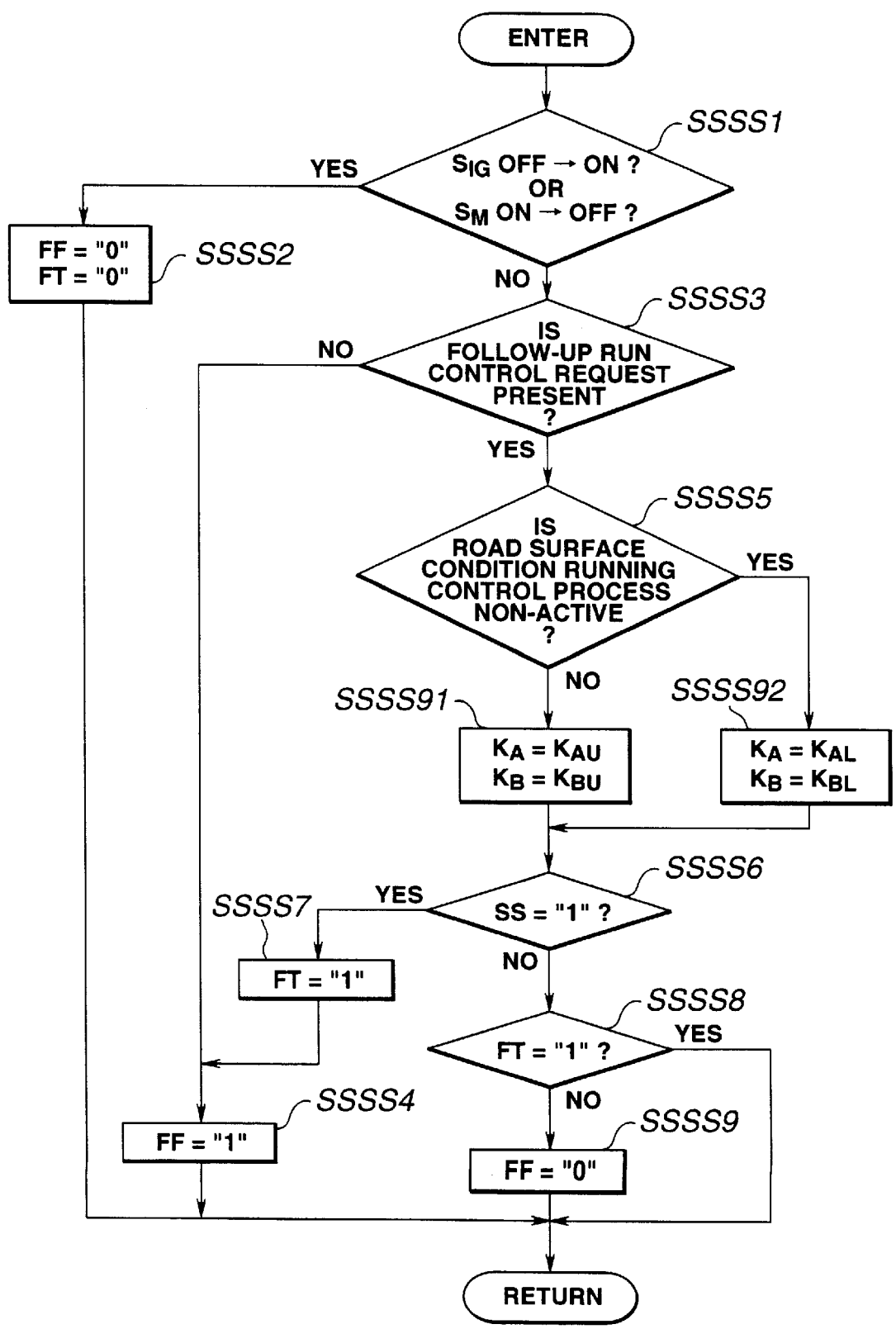
FIG. 22 is an operational flowchart representing an example of the preceding vehicle follow-up run control managing procedure of a twelfth preferred embodiment of the automatic vehicular velocity controlling apparatus according to the present invention.

FIG. 22 shows the preceding vehicle follow-up run control managing procedure executed in a twelfth preferred embodiment of the automatic vehicular velocity controlling apparatus according to the present invention.

In the twelfth embodiment, when the CPU of the preceding vehicle follow-up run controller 20 starts the preceding vehicle follow-up run control, the control gains used to calculate the target value G* of the vehicular acceleration/deceleration are modified to smaller values as compared with the ordinary values thereof when the road surface situation dependent vehicular run control processing including the driving force control processing and the side-slip control processing are in the non-operation states.

In the twelfth embodiment, in the preceding vehicle follow-up run managing procedure executed in the preceding vehicle follow-up run controller 20 and shown in FIG. 22, the step SSSS71 described in the eleventh embodiment shown in FIG. 20 is replaced with a step SSSS91. At the step SSSS91, the CPU of the controller 20 sets the control gains $K_A$ and $K_B$ defined in the equations (2) and (3) and required to calculate the target value G* of the vehicular acceleration/deceleration to the ordinary values $K_{AU}$ and $K_{BU}$. In addition, the step SSSS72 shown in FIG. 20 is replaced with a step SSSS91 in which the control gains $K_A$ and $K_B$ are set to suppression values $K_{AL}$ and $K_{BL}$ which are smaller than the ordinary values $K_{AU}$ and $K_{BU}$.

In addition, the step SSSS72 shown in FIG. 20 is replaced with a step SSSS91 in which the control gains $K_A$ and $K_B$ are set to suppression values $K_{AL}$ and $K_{BL}$ which are smaller than the ordinary values $K_{AU}$ and $K_{BU}$. The other steps are the same as those shown in FIG. 20. The detailed description thereof with reference to FIG. 22 will herein be omitted.

In the twelfth embodiment, suppose a state such that when the preceding vehicle follow-up run control is started with both of the main switch SWM and the set switch SWS turned on, the functional off switch $SW_{OF}$ turned on, the functional off switch $SW_{OF}$ connected to the vehicular state controller 19 is turned off and both of the driving force control processing and the side-slip control processing are in the operation states. In this state, the routine of FIG. 22 goes from the step SSSS5 to the step SSS91 in which the CPU of the controller 20 sets the control gains $K_A$ and $K_B$ to ordinary values $K_{AU}$ and $K_{BU}$.

Therefore, the target value G* of the vehicular acceleration/deceleration calculated at the step SS25 or SS26 in the preceding vehicle follow-up run control processing in FIG. 13 is set to an appropriate value when the vehicle is running on the high frictional coefficient road surface. Consequently, an optimum preceding vehicle follow-up run control is carried out with the inter-vehicle distance D(n) being speedily made coincident with the target value D*(n) of the inter-vehicle distance.

On the other hand, suppose a state such that the driving force control processing and the side-slip control processing are in the non-operation states. In this state, the routine shown in FIG. 22 goes from the step SSSS5 to the step SSSS92.

At the step SSSS92, the CPU of the controller 20 sets the control gains $K_A$ and $K_B$ described above to the suppression values $K_A$ and $K_{BL}$ smaller than the ordinary values $K_{AU}$ and $K_{BU}$, respectively. Then, when the preceding vehicle follow-up run control shown in FIG. 13 is executed, the target value G* of the vehicular acceleration/deceleration calculated at the step SS25 or SS26 indicates a smaller value as compared with the above-described state in which the driving force control processing and the side-slip control processing are in the operation states. Hence, if the vehicle runs on the low frictional coefficient road surface with the preceding vehicle follow-up run control being executed, the control over the acceleration or deceleration is carried out at a relatively moderate pace and a frequency that the control over the acceleration or deceleration is carried out becomes lower. Consequently, the stable control for the vehicle to follow up the preceding vehicle at the target inter-vehicle distance can be achieved.

It is noted that, in the twelfth embodiment, when the driving force control processing and the side-slip control processing are in the non-operation state, the control gains $K_A$ and $K_B$ are modified from the ordinary values to the suppression values.

However, the calculated target value G* of the vehicular acceleration/deceleration may alternatively be multiplied by a correction coefficient smaller than 1.

Or alternatively, a dead zone may be provided in the target value G* of the vehicular acceleration/deceleration (variation rate of the vehicular velocity).

(Alternatives)

In each embodiment described above, the target value D* of the inter-vehicle distance is calculated and the target value G* of the vehicular acceleration/deceleration is calculated by the comparison of the target value D* of the inter-vehicle distance with the target value G* of the vehicular acceleration/deceleration.

However, the target vehicular velocity V*(n) may be determined on the basis of the actual value of the inter-vehicle distance D(n) so that the time duration To (inter-vehicle time duration) for which the vehicle has reached to Lo (m) behind the preceding vehicle becomes constant.

The engine output value α may be calculated on the basis of a deviation ΔV(n) between the target vehicular velocity V* (n) and the actual vehicular velocity V(n). If α>0, the engine 2 may be controlled to provide the acceleration for the vehicle on the basis of the value of α. If α<0, the target braking pressure PB* may be set through a PD (proportional-differential) control mode or a PID (proportional-integral-differential) control mode on the basis of the velocity deviation ΔV(n).

Furthermore, in each embodiment, the estimated vehicular body velocity Vc may be calculated on the basis of the wheel velocities of four road wheels. However, the vehicular body velocity Vc may be calculated from an average value of the wheel velocities of the non-driven road wheels, or alternatively may be calculated by detecting a revolution velocity of an output shaft of the vehicular automatic transmission 3, or may be calculated by integrating the longitudinal acceleration.

In each embodiment, the CPU of the vehicular run controller 20 determines that the vehicle is running on the low frictional coefficient road surface when the vehicular run controller 19 executes the driving force control or the side-slip control.

However, the road surface condition (road surface situation) may be detected on the basis of a difference in the revolution velocity or a difference in the revolution number between the front and rear road wheels 1FL and 1RL and 1FR and 1RR, those being used as parameters in the driving force control.

In each embodiment, the side-slip control procedure executed in the vehicular state controller 19 calculates the side-slip angle and controls so that the calculated side-slip angle is made coincident with the target value of the side-slip angle.

However, a target yaw rate may be calculated on the basis of the steering angular displacement θ detected by the steering angle sensor 16 and the braking force may be controlled so that the yaw rate ψ detected by means of the yaw rate sensor 14 is made coincident with the calculated target yaw rate.

In each embodiment, the two separate controllers 19 and 20 are used.

However, a single controller may execute all of the driving force control (traction control and the anti-lock brake control are inclusive), the side-slip control, and the preceding vehicle follow-up run control. Hence, a control function defined in the claims corresponds to that the vehicular run controller 20 has in the case of the two separate controllers as in each embodiment and another control function defined in the claims corresponds to that the vehicular state controller 19 has in the case of the two separate controllers as in each embodiment.

In each embodiment described above, the preceding vehicle follow-up run control managing procedure manages if the preceding vehicle follow-up run control should be executed or not. However, these two procedures may be integrated to form a single processing routine.

In each embodiment, the preceding vehicle follow-up run control processing is activated according to the preceding vehicle follow-up run control managing procedure. However, the preceding vehicle follow-up run control processing may be executed in response to the measured time by the timer as the timer interrupt routine.

Upon completion of the timer interrupt processing after the process of the step S21 is ended, the routine may be returned to the processing of FIG. 2.

In this case, if the preceding vehicle follow-up run control inhibit flag FF is set to "1", the timer interrupt processing is ended via the steps S20 and S21. Only if the preceding vehicle follow-up run control inhibit flag FF is at a "0", the preceding vehicle follow-up run control described in the steps S20 through S31 is carried out at the steps S22 through S31.

In each embodiment, two of the main switch SWM and set switch SWS are applied, either one of these two switches may be omitted.

In each embodiment, the start of the preceding vehicle follow-up run control is started when the vehicular velocity is equal to or higher than the set lower limit value Vs.

The control start condition may be the case when either one of the main switch SWM or the set switch SWS is turned on. In this case, a monitoring time interval may be provided for which the execution state of the driving force control and/or side-slip control is maintained while either the vehicle runs at a predetermined distance or a predetermined time has passed from a time at which the vehicle has started, either one of the two switches is changed from the off state to the on state, and control is transferred to the preceding vehicle follow-up run control inhibit state during the preceding vehicle follow-up run control execution.

It is preferable that the preceding vehicle follow-up run control is started after the monitoring time interval has passed in order to prevent an unintentional start of the preceding vehicle follow-up run control.

In each of the seventh through twelfth embodiments, the operation states and the non-operation states of the driving force control procedure and the side-slip control procedure are determined on the basis of the state change in the functional off switch SWOF.

However, a control signal indicating that neither the driving force control procedure nor the side-slip control procedure is in the operation states (both control procedures are in the non-operation states) may be outputted from the vehicular state controller 19 to the vehicular run controller 20.

In this alternative case, it is also possible for the vehicular driver to be informed that a fail-safe procedure operated if each sensor or internal control procedure is operated abnormally or the hardware structure or any one or more of the sensors or hardware structure in the vehicular state controller 19 occurs causes the driving force control procedure and the side-slip control to be in the non-operation states.

In each embodiment, the automatic transmission 3 is disposed on the output side of the engine 2. However, a continuously variable transmission (CVT) may be disposed on the output side of the engine.

In each embodiment, the present invention is applicable to the rear-wheel-drive vehicle.

However, the present invention is applicable to a front-wheel-drive vehicle or a four-wheel-drive (4WD) vehicle. Or alternatively, the present invention is applicable to an electric vehicle to which an electric motor is applied in place of the engine 2. Furthermore, the present invention is applicable to a hybrid vehicle in which both of the engine and the motor are used together as a prime mover. In this case, an electric motor controller may be applied in place of the engine output controller.

It is noted that the side-slip control is exemplified by a U.S. Pat. No. 5,893,896 issued on Apr. 13, 1999 as vehicular stability controlling apparatus and method (, the disclosure of which is herein incorporated by reference).

It is also noted that the traction control (TCS) is exemplified by a U.S. Pat. No. 5,566,776 issued on Oct. 22, 1996 (, the disclosure of which is herein incorporated by reference).

A vehicular velocity controlling apparatus for an automotive vehicle comprises: a vehicular run controller, the vehicular run controller being operated to perform a vehicular velocity control for the vehicle to follow up a preceding vehicle which is running ahead of the vehicle and to maintain an inter-vehicle distance to the preceding vehicle at a target value of the inter-vehicle distance; a vehicular state controller, the vehicular state controller being operated to perform a vehicular state control in accordance with a predetermined frictional coefficient of a road surface on which the vehicle runs; a flag register, the flag register registering that the vehicular state controller is in a control state against the predetermined frictional coefficient when the vehicular state controller is entered into the control state; and a control instruction generator, the control instruction generator generating and outputting a disable instruction to inhibit an operation of the vehicular velocity control performed by the vehicular run controller when the flag register registers that the vehicular state controller is in the control state.

The entire contents of Japanese Patent Applications No. Heisei 10-171552 filed Jun. 18, 1998 and No. Heisei 10-184457 filed Jun. 30, 1998 are herein incorporated by reference.

Although the invention has been described above by reference to certain embodiments of the invention, the present invention is not limited to the embodiments described above. Modifications and variations of the embodiments described above will occur to those skilled in the art in light of the above teachings.

The scope of the present invention is defined with reference to the following items.

What is claimed is:

1. A vehicular velocity controlling apparatus for an automotive vehicle, comprising:
   a controller, the controller including a first control function which performs a vehicular velocity control for the vehicle to follow up a preceding vehicle which is running ahead of the vehicle and to maintain an inter-vehicle distance to the preceding vehicle at a target inter-vehicle distance;
   a road surface situation detector, the road surface situation detector detecting a road surface situation on which the vehicle runs; and
   a control instruction generator, the control instruction generator being responsive to a detection by the road surface situation detector indicating that the detected road surface has a predetermined frictional coefficient at which vehicular slips can easily occur, and generating and outputting a disable instruction to inhibit an operation of the first control function of the controller to perform the vehicular velocity control to follow up the preceding vehicle.

2. A vehicular velocity controlling apparatus for an automotive vehicle as claimed in claim 1, wherein the controller further includes: a second control function which performs a vehicular state control in accordance with the predetermined frictional coefficient; and a flag register, the flag register registering that the second control function is in a control state based on the predetermined frictional coefficient of the road surface, and wherein the control instruction generator is installed in the controller and generates and outputs the disable instruction to the first control function to inhibit the control function such as to perform the vehicular velocity control for the vehicle to follow up the preceding vehicle, when the flag register registers that the second control function is in the control state based on the predetermined frictional coefficient.

3. A vehicular velocity controlling apparatus for an automotive vehicle as claimed in claim 2, wherein the controller further includes a counter, the counter counting a number of times per unit time the second control function has performed the vehicular state control in accordance with the predetermined frictional coefficient of the road surface on which the vehicle has run, and wherein the flag register registers that the second control function is in the control state when the counted number of times per unit time has exceeded a predetermined number of times per unit time.

4. A vehicular velocity controlling apparatus for an automotive vehicle as claimed in claim 3, wherein the control instruction generator includes: an information supplier, the information supplier indicating that the second control function is in the control state when the first control function is about to perform the vehicular velocity control to follow up the preceding vehicle; and a confirmation operation detector, the confirmation operation detector detecting whether a vehicular driver's confirmation operation is carried out after the information supplier has indicated that the second control function is in the control state and wherein the control instruction generator generates and outputs the control disable instruction to the first control function to inhibit the first control function such as to perform the vehicular velocity control to follow up the preceding vehicle when the confirmation operation detector detects that the vehicular driver's confirmation operation is not carried out, and generates and outputs a control enable instruction to the first control function to enable the first control function to perform the vehicular velocity control to follow up the preceding vehicle when the confirmation operation detector detects that the vehicular driver's confirmation operation is carried out.

5. A vehicular velocity controlling apparatus for an automotive vehicle as claimed in claim 2, wherein the second control function of the controller includes a traction control for preventing slips of the vehicle road wheels from occurring.

6. A vehicular velocity controlling apparatus for an automotive vehicle as claimed in claim 2, wherein the second control function of the controller includes a side-slip control for preventing a side slip of the vehicle from occurring.

7. A vehicular velocity controlling apparatus for an automotive vehicle as claimed in claim 2, wherein the second control function of the controller includes an anti-lock brake control.

8. A vehicular velocity controlling apparatus for an automotive vehicle as claimed in claim 5, wherein the flag register registers that the traction control is in the control state when the traction control is activated within a range of a vehicular acceleration used in an ordinary traction control.

9. A vehicular velocity controlling apparatus for an automotive vehicle as claimed in claim 6, wherein the flag register registers that the side-slip control is in the control state when the side-slip control is activated within a range of a lateral acceleration imposed on a body of the vehicle and used in an ordinary side-slip control.

10. A vehicular velocity controlling apparatus for an automotive vehicle as claimed in claim 7, wherein the flag register registers that the anti-lock brake control is in the control state within a range of a vehicular deceleration used in an ordinary anti-lock brake control.

11. A vehicular velocity controlling apparatus for an automotive vehicle as claimed in claim 2, further comprising a non-operation state detector, the non-operation state detector detecting whether the second control function of the controller is in a non-operation state, and wherein the control instruction generator generates and outputs the disable instruction to inhibit the first control function of the controller from performing the vehicular velocity control to follow up the preceding vehicle when the non-operation state detector detects that the second control function is in the non-operation state.

12. A vehicular velocity controlling apparatus for an automotive vehicle as claimed in claim 2, further comprising a non-operation state detector, the non-operation state detector detecting whether the second control function of the controller is in a non-operation state, and wherein the control instruction generator includes a forced operation recovery setter, the forced operation recovery setter generating and outputting a forced operation instruction to forcefully operate the second control function of the controller when the non-operation state detector detects that the second control function is in the non-operation state and when the first control function is about to perform the vehicular velocity control to follow up the preceding vehicle.

13. A vehicular velocity controlling apparatus for an automotive vehicle as claimed in claim 11, further comprising a functional off switch, the functional off switch turning off the second control function when it is turned on and turning on the second control function when it is turned off and wherein the non-operation state detector detects that the second control function is in the non-operation state when the functional off switch is turned on.

14. A vehicular velocity controlling apparatus for an automotive vehicle as claimed in claim 13, wherein the forced operation recovery setter includes a switch instruction generator, the switch instruction generator generating and outputting a forced switch instruction to force the second control function into its function operation state while invalidating the functional off switch when the second control function of the controller is in the non-operation state with the functional off switch turned on.

15. A vehicular velocity controlling apparatus for an automotive vehicle as claimed in claim 2, further comprising a non-operation state detector, the non-operation state detector detecting whether the second control function of the controller is in a non-operation state, and a control suppressor, the control suppressor being responsive to a result of a detection by the non-operation detector indicating that the second control function is in the non-operation state and suppressing the vehicular velocity control for the vehicle to follow up the preceding vehicle performed by the first control function of the controller with respect to an ordinary control state when the road surface situation detector detects that the detected road surface does not exhibit the predetermined frictional coefficient.

16. A vehicular velocity controlling apparatus for an automotive vehicle as claimed in claim 15, wherein the control suppressor includes a corrector, the corrector correcting a limit value on a target value of a variation rate of the vehicular velocity to a smaller value, the target value of the variation rate being calculated on the basis of at least one of a deviation between a detected value of the inter-vehicle distance and the target value thereof and the deviation between the vehicular velocity and a target vehicular velocity.

17. A vehicular velocity controlling apparatus for an automotive vehicle as claimed in claim 15, wherein the control suppressor includes a corrector, the corrector correcting a limit value on a target value of the inter-vehicle distance to a greater value than its ordinary value, the target value of the inter-vehicle distance being calculated on the basis of a deviation between a detected value of the vehicular velocity and a target value thereof.

18. A vehicular velocity controlling apparatus for an automotive vehicle as claimed in claim 15, wherein the control suppressor includes a control gain modifier, the control gain modifier modifying a control gain from its ordinary value to a smaller value, the control gain by which at least one of a deviation between a detected value of the vehicular velocity and a target value thereof and the deviation between a detected value of the inter-vehicle distance and a target value thereof being multiplied when the first control function calculates a target value of a variation rate of the vehicular velocity.

19. A vehicular velocity controlling apparatus for an automotive vehicle as claimed in claim 2, further comprising:
  a non-operation state detector, the non-operation state detector detecting whether the second control function is in the non-operation state,
  an information supplier which is responsive to a result of a detection by the non-operation state detector and which indicates that the second control function is in the non-operation state when the non-operation detector detects the same, and
  a confirmation operation detector, the confirmation operation detector being responsive to an information by the information supplier and detecting whether a vehicular driver's confirmation operation is carried out, and wherein the control instruction generator generates and outputs an enable instruction to continue the vehicular velocity control for the vehicle to follow up the preceding vehicle performed by the first control function of the controller only when the confirmation operation detector detects that the vehicular driver's confirmation operation is carried out.

20. A vehicular velocity controlling apparatus for an automotive vehicle, comprising:
  preceding vehicle follow-up run controlling means for performing a vehicular velocity control for the vehicle to follow up a preceding vehicle which is running ahead of the vehicle and to maintain an inter-vehicle distance between the vehicle and the preceding vehicle at a target value of the inter-vehicle distance if the preceding vehicle is present and for performing a vehicular velocity control for the vehicle to establish an auto-cruise at a set vehicular velocity if no preceding vehicle is present;

road surface situation detecting means for detecting a road surface situation on which the vehicle runs; and control disabling means for generating and outputting a disable instruction to inhibit an operation of a function that the preceding vehicle follow-up run controlling means has, when the road surface situation detecting means indicates that the detected road surface has a predetermined frictional coefficient which is such as to allow easy vehicular slips.

21. A vehicular velocity controlling method for an automotive vehicle, comprising:

detecting a road surface situation of a road surface on which the vehicle runs;

determining whether the detected road surface has a predetermined frictional coefficient which invites vehicular wheel slips;

outputting a disable instruction to inhibit an operation of a preceding vehicle follow-up run control such as to perform a vehicular velocity control for the vehicle to follow up a preceding vehicle which is running ahead of the vehicle and to maintain an inter-vehicle distance to the preceding vehicle at a target value of the inter-vehicle distance when determining that the detected road surface has a predetermined frictional coefficient.

22. A vehicular velocity controlling apparatus for an automotive vehicle, comprising:

a controller, said controller comprising a first follow-up control function which controls vehicular velocity control to follow up a preceding vehicle and maintains a target inter-vehicle distance from the preceding vehicle;

a road surface condition detector which detects a condition of a road surface on which the vehicle is running;

a control instruction generator, the control instruction generator being responsive to a detection by the road surface condition detector indicating that the detected road surface has a predetermined frictional coefficient at which vehicular slip can easily occur, and generates and outputs a disable instruction to inhibit the follow-up control by the follow-up control function;

said controller further including:

a second control function which performs a vehicular state control in accordance with the predetermined frictional coefficient;

a flag register, the flag register registering that the second control function is in a control state based on the predetermined frictional coefficient of the road surface, and wherein the control instruction generator is installed in the controller and generates and outputs the disable instruction to the follow up control function to inhibit the vehicular velocity control which enables the vehicle to follow up the preceding vehicle, when the flag register registers that the second control function is in the control state based on the predetermined frictional coefficient; and a non-operation state detector, the non-operation state detector detecting whether the second control function of the controller is in a non-operation state.

* * * * *